US012694999B1

(12) United States Patent
Braun et al.

(10) Patent No.: US 12,694,999 B1
(45) Date of Patent: Jul. 28, 2026

(54) METHODS AND DEVICES FOR RADIOACTIVE WASTE SOLIDIFICATION

(71) Applicant: AVANTech, LLC, Columbia, SC (US)

(72) Inventors: James L. Braun, Blythewood, SC (US); Tracy A. Barker, Columbia, SC (US)

(73) Assignee: AVANTech, LLC, Columbia, SC (US)

( * ) Notice: Subject to any disclaimer, the term of this patent is extended or adjusted under 35 U.S.C. 154(b) by 959 days.

(21) Appl. No.: 17/874,596

(22) Filed: Jul. 27, 2022

Related U.S. Application Data

(60) Provisional application No. 63/271,519, filed on Oct. 25, 2021.

(51) Int. Cl.
*G21F 9/00* (2006.01)
*B01F 23/50* (2022.01)
(Continued)

(52) U.S. Cl.
CPC ............ *G21F 9/008* (2013.01); *B01F 23/511* (2022.01); *B01F 23/53* (2022.01); *B01F 23/57* (2022.01);
(Continued)

(58) Field of Classification Search
CPC . G21F 9/008; G21F 5/005; G21F 5/06; G21F 9/304; G21F 9/36; B01F 23/511; B01F 23/53; B01F 23/57; B01F 27/112; B01F 27/191; B01F 27/1921; B01F 27/906; B01F 27/9213; B01F 27/9214;
(Continued)

(56) References Cited

U.S. PATENT DOCUMENTS 2,961,399 A * 11/1960 Alberti ...................... G21F 9/12 106/718
9,218,897 B1 12/2015 Braun
(Continued)

FOREIGN PATENT DOCUMENTS

EP 3140054 B1 9/2023
JP 2007192666 A * 8/2007
JP 2013053961 A * 3/2013

OTHER PUBLICATIONS

Special Advertising Section, Avantech, LLC. Nuclear News, Aug. 2021.

(Continued)

*Primary Examiner* — Daniel C. McCracken
*Assistant Examiner* — Starfari Teshawn McClain
(74) *Attorney, Agent, or Firm* — Nelson Mullins Riley & Scarborough LLP

(57) ABSTRACT

A method for the solidification and packaging of waste is provided. The method includes providing a container and solidification materials, mixing the solidification materials, and inserting the solidification materials into the container at a first site location. The method also includes transporting the container having the solidification materials to a second site location, providing waste materials at the second site location, inserting waste materials into the container at the second location, and mixing the waste materials and the solidification materials in the container at the second site location. The first site location is not located on-site at a nuclear facility, and the second site location is located on-site at a nuclear facility.

9 Claims, 20 Drawing Sheets

(51) Int. Cl.

| | |
|---|---|
| ***B01F 23/53*** | (2022.01) |
| ***B01F 23/57*** | (2022.01) |
| ***B01F 27/112*** | (2022.01) |
| ***B01F 27/191*** | (2022.01) |
| ***B01F 27/192*** | (2022.01) |
| ***B01F 27/906*** | (2022.01) |
| ***B01F 27/921*** | (2022.01) |
| ***B01F 35/30*** | (2022.01) |
| ***B01F 35/32*** | (2022.01) |
| ***B01F 35/71*** | (2022.01) |
| ***B01F 101/28*** | (2022.01) |
| ***G21F 5/005*** | (2006.01) |
| ***G21F 5/06*** | (2006.01) |
| ***G21F 9/30*** | (2006.01) |
| ***G21F 9/36*** | (2006.01) |

(52) U.S. Cl.

CPC .......... *B01F 27/112* (2022.01); *B01F 27/191* (2022.01); *B01F 27/1921* (2022.01); *B01F 27/906* (2022.01); *B01F 27/9213* (2022.01); *B01F 27/9214* (2022.01); *B01F 35/3211* (2022.01); *B01F 35/717* (2022.01); *G21F 5/005* (2013.01); *G21F 5/06* (2013.01); *G21F 9/304* (2013.01); *G21F 9/36* (2013.01); *B01F 2035/351* (2022.01); *B01F 2101/28* (2022.01)

(58) Field of Classification Search

CPC ................ B01F 35/3211; B01F 35/717; B01F 2035/351; B01F 2101/28

See application file for complete search history.

(56) References Cited

U.S. PATENT DOCUMENTS

| | | | |
|---|---|---|---|
| 9,896,351 | B2 | 2/2018 | Barker et al. |
| 2020/0098484 | A1 | 3/2020 | Burns |
| 2022/0051823 | A1 | 2/2022 | Barker et al. |

OTHER PUBLICATIONS

Avantech's Advanced Polymer Solidification for Radioactive & Mixed Waste Stabilization: Case Studies—18571. WM2018 Conference, Mar. 18-22, 2018, Phoenix, Arizona, USA.

* cited by examiner

METHODS AND DEVICES FOR RADIOACTIVE WASTE SOLIDIFICATION

PRIORITY CLAIM

This application is based upon and claims the benefit of U.S. provisional application Ser. No. 63/271,519, filed Oct. 25, 2021, which is incorporated herein by reference for all purposes.

FIELD OF THE INVENTION

Embodiments of this invention relate to the transfer, containment, stabilization, and solidification of radioactive and/or hazardous waste.

BACKGROUND OF THE INVENTION

Performing work at current or former plutonium production facilities is complex and presents multiple risks. First, facilities used to store nuclear fuel dissolution raffinate (radioactive waste) present complex occupational health challenges—these wastes contain radioactive, hazardous, and volatile impurities that require owners to apply multiple engineering controls and various types of personal protective equipment to protect workers from harm. Second, these facilities contain a measurable amount of fission products and fissile material such as Cesium-137, Strontium-90, Uranium-235, and Plutonium-239, which require nuclear security and related safeguards.

The complex array of health, safety, and security measures required to protect workers and security onsite at a nuclear facility makes it very difficult to complete onsite work in a timely and cost-effective manner. This fact is especially true for processes like radioactive waste solidification, which requires large volumes of high-density solidification materials. An aqueous solidification process with the same radioactive waste treatment capacity as a single Hanford low-activity waste vitrification melter would require approximately 60,000 pounds per day of solidification material (consumables).

Traditionally, this solidification material must be stored on-site (typically in silos) at a nuclear facility. Then, the solidification material must be transferred from a silo to a weigh bin or to a loss-in-weight feeder. Solidification material is then metered into a mixer containing aqueous radioactive waste, which homogeneously mixes the radioactive waste with solidification materials.

The first step of traditional solidification processes is the introduction of an aqueous waste into a mixer or mixing container. Adding aqueous waste first aids in lowering the overall mixer torque. The second step often requires preconditioning chemicals, such as those required to change the pH. At the third step, dry cementitious solidification materials such as blast furnace slag, fly ash, silica fume, calcined clay, and Portland cement are introduced to an energized mixing container where all materials are thoroughly mixed with the waste. If a mixer is used, then the waste is transferred to a disposal container. Once the homogeneously combined waste and solidification material, referred to as grout, are in a disposal container, the entire contents are then allowed to cure into a solid monolith that binds the waste materials in a stable matrix suitable for transportation and disposal. Since radioactive materials regulations and permits make the transfer of large amounts of aqueous waste to a second offsite facility (for solidification) impractical, this traditional solidification process is typically performed entirely at a single location that is on-site at a nuclear facility.

SUMMARY OF THE INVENTION

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but are not intended to be defining of the full scope of the present invention.

Various embodiments described herein provide a two-stage method for aqueous radioactive waste solidification and various devices such as for use with the same. This two-stage method provides a feasible and practical approach for solidification and disposal of waste materials. Due to the forementioned considerations associated with nuclear facilities, operations for the "non-nuclear" tasks of solidification material handling can take place much more efficiently at an off-site industrial facility. Solidification material may be pre-loaded into containers at the off-site industrial facility and then transported to a nuclear facility where radioactive waste is added to the container, and the contents (radioactive waste material and solidification material) are mixed to create a solidified and stable grout product that is acceptable for disposal. Mixing may take place at the on-site location while waste material is being added and/or after waste material has been added to form a grout product that is stable, solidified, and acceptable for disposal.

By completing non-radioactive activities such as preloading containers with solidification material at an off-site facility, the number of tasks that must be completed on-site at a nuclear facility may be reduced. Because concerns raised by the presence of radioactive materials are not involved at the off-site facility, the efficiency of disposal may be greatly improved. In this regard, a two-stage process eliminates the need for on-site equipment for solidification material handling and dust control. More specifically, the two-stage process may eliminate the need for on-site receipt, receipt inspection/acceptance, storage, transfer, and/or metering of the solidification materials. This may reduce equipment space requirements and minimize the cost for radioactive solidification. The two-stage process may simplify the on-site process and reduce on-site requirements for facility design and construction, permitting (especially air permitting), and operational costs for receiving, storing, and inventorying solidification materials and empty containers.

Containers may be provided with features that may improve the efficiency of disposal. Containers may be dual-use containers that may be used for both the solidification of waste material and for the final disposal of solidified waste. The containers may include an internal mixing impeller configured to mix raw solidification materials if only solidification materials are present in the container. The internal mixing impeller may operate with sufficient force (e.g., torque) to move through solidification materials, which may be a dry-blend of cementitious materials with a high resistance to movement. Additionally, as waste material is introduced into the container, the internal mixing impeller may be configured to mix solidification materials and waste material together to form a homogenous grout material.

In some embodiments, containers may have multiple internal channels configured to receive waste material from a waste feed port on a fill head. These internal channels may distribute waste material from the waste feed port to outlets at different positions within the container. Specifically, rather than introducing all of the waste material at one position (location) within the container, the waste material is divided so that smaller amounts of waste material may be simultaneously introduced at multiple positions (e.g., levels) within the container. By introducing waste material at different locations, waste material may be mixed more efficiently. The time for mixing may therefore be reduced.

In an example embodiment, a method for the solidification and packaging of waste is provided. The method may include providing a container and solidification materials, and inserting the solidification materials into the container at a first site location. The method may also include transporting the container having the solidification materials to a second site location, introducing waste materials into the container at the second site location, and mixing the waste materials and the solidification materials in the container at the second site location. In this example embodiment, the first site location is not located on-site at a nuclear facility, and the second site location is located on-site at a nuclear facility.

The container may include an internal mixing impeller, and mixing the waste materials and the solidification materials in the container at the second site location may be accomplished using the internal mixing impeller. Methodology is contemplated that further comprises allowing the grout material to solidify in the container with the internal mixing impeller in situ. Methodology is also contemplated comprising allowing the grout material to solidify in the container and disposing of the container with the grout material therein.

In some cases, the internal mixing impeller may be configured to operate with sufficient torque to mix solidification materials in the container when no waste material is present. Further, the internal mixing impeller may include a shaft configured to be connected to a motor, and the motor may be configured to impart at least approximately 2,000 lb-ft of torque on the shaft.

In some cases, the grout material is allowed to solidify in the container and the container is disposed of with the internal mixing impeller in situ. Moreover, introducing waste materials into the container at the second site location may comprise introducing waste materials into an interior of the container at multiple positions. For example, the container may have at least one internal channel configured to distribute the waste material to the multiple positions within the container.

In some case, the methodology may further comprise placing the container inside a transportable modular enclosure. The step of inserting waste materials into the container may involve transferring the waste materials from a waste tank at the second site location.

Another aspect of the present invention provides a container for packaging and solidification of waste. The container according to this aspect comprises a housing structure defining an interior space, the housing structure including a top having a matching structure defining a port for introduction of waste material. A mixing impeller is positioned in the interior space of the housing structure, the mixing impeller including a connection portion by which a turning mechanism outside of the housing structure can be connected to effect rotation of the mixing impeller.

In some exemplary embodiments, the mixing impeller may have a vertical shaft with a plurality of mixing blades extending radially from the shaft. The plurality of mixing blades may include a plurality of longer first cross members (e.g., mixing blades) and a plurality of shorter second mixing blades at different vertical positions along the shaft. For example, the mixing impeller may include at least eight first cross members and at least eight second mixing blades. In some cases, the mixing impeller may include at least twelve second mixing blades.

An interconnect structure may connect together distal ends of the first cross members. For example, the interconnect structure may comprise at least one ribbon-shaped helical element. In some embodiments, the interconnect structure may comprise first and second ribbon-shaped helical elements arranged in a double-helix.

In some exemplary embodiments, the matching structure may include a gasket for mating with a fill head. In some exemplary embodiments, the container may comprise at least one internal channel in fluid communication with the port, the internal channel defining multiple outlets configured to distribute the waste material to multiple positions within the container.

Another aspect of the present invention provides a method for the solidification and packaging of waste. The method may include providing a container and solidification materials, mixing the solidification materials, inserting the solidification materials into the container at a first site location. The method may also include sending the container having the solidification materials to a second site location. In this embodiment, the first site location is not located on-site at a nuclear facility and the second site location is located on-site at a nuclear facility.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The embodiments of the present invention will become more fully understood from the detailed description and the accompanying drawings, which are not necessarily to scale, wherein.

DESCRIPTION OF THE PREFERRED EMBODIMENTS

Figure 1A:
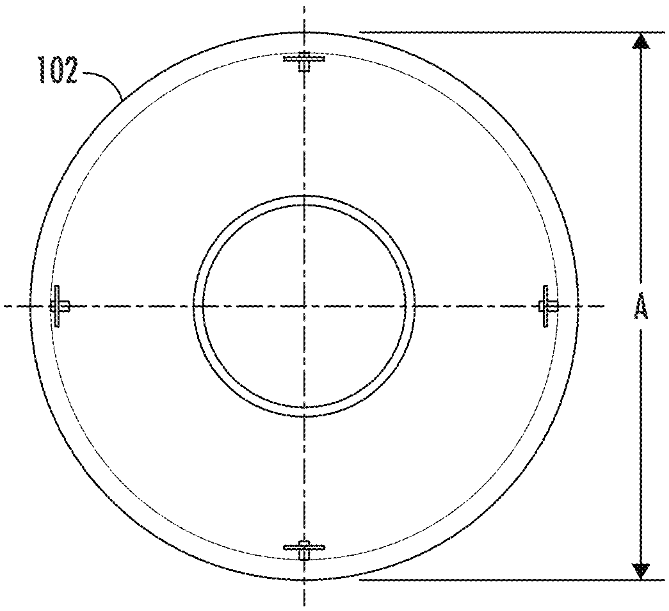
FIG. 1A is a top view of an example container, in accordance with an embodiment of the present invention.

Some example embodiments now will be described more fully hereinafter with reference to the accompanying drawings, in which some, but not all example embodiments are shown. For instance, features illustrated or described as part of one embodiment may be used on another embodiment to yield a still further embodiment. Thus, it is intended that the present invention covers such modifications and variations as come within the scope of the appended claims and their equivalents. In addition, the examples described and pictured herein should not be construed as being limiting as to the scope, applicability, or configuration of the present disclosure. Like reference numerals generally refer to like elements throughout. Statements herein that a component is "attached" to another component are intended to indicate that these components are directly or indirectly attached together unless stated otherwise.

Further, the term "or" as used herein is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used herein should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

In many embodiments, a container may be provided for the containment of waste and solidification materials. The container may be configured to serve as a dual-use solidification and disposal container, and the container may have an internal mixing impeller that enables solidification materials to be added as a cementitious pre-mix to the container or individual solidification materials may be added and mixed within the container before any waste is introduced into the container. While the solidification materials may have a high resistance to movement as compared to any aqueous waste, the internal mixing impeller may operate with sufficient torque to mix solidification materials in the container. Notably, the term "impeller" is intended to be construed herein as covering any appropriate rotatable structure having one or more paddles (blades) and/or the like to effect mixing.

Figure 1B:
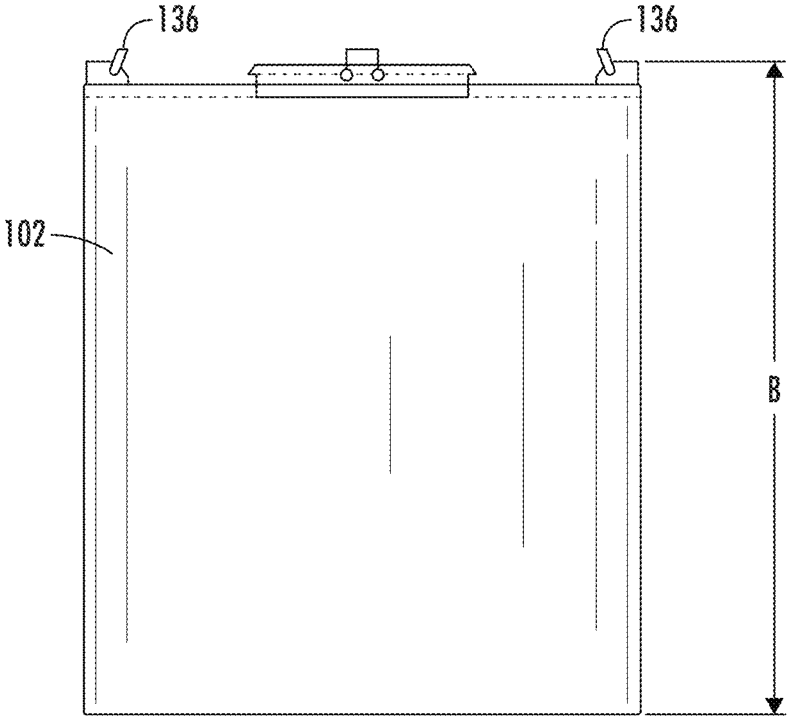
FIG. 1B is a side view of an example container, in accordance with an embodiment of the present invention.
Figure 2B:
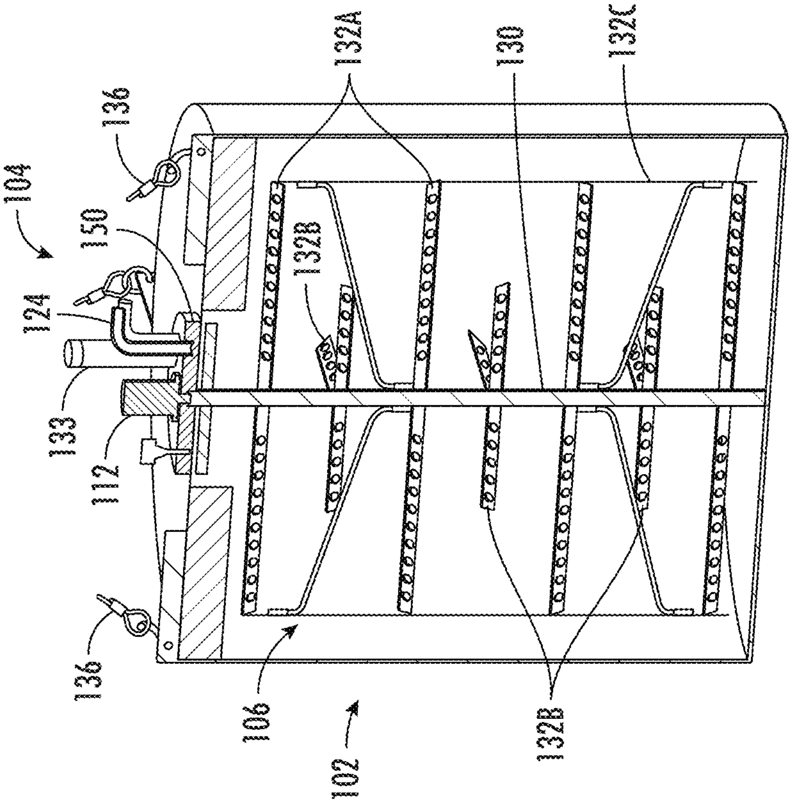
FIG. 2B is a diagrammatic, cross-sectional view of an example container and a fill head secured to the container, in accordance with an embodiment of the present invention.
Figure 2A:
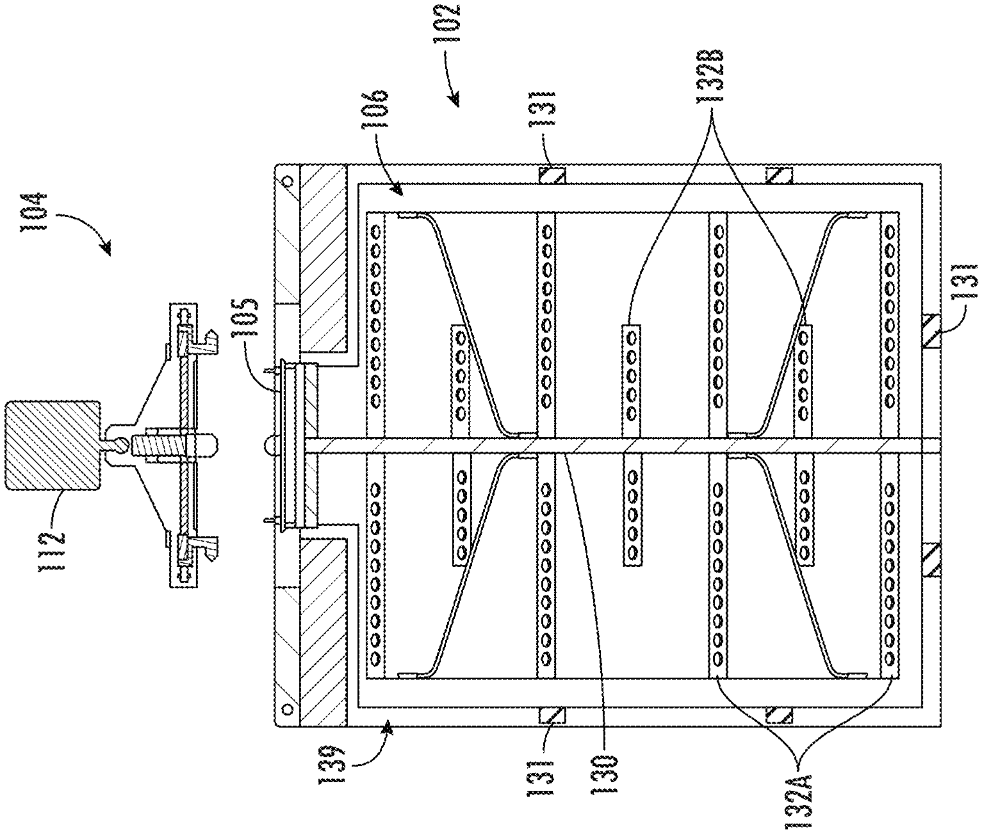
FIG. 2A is a diagrammatic, cross-sectional view of an example container and a fill head separated from the container, in accordance with an embodiment of the present invention.

FIGS. 1A-1B and 2A-2B illustrate various features of an example container 102 in accordance with some embodiments. FIG. 1A is a top view of the example container, with FIG. 1B being a side view of the container of FIG. 1A. FIG. 2A is a diagrammatic, cross-sectional view of an example container and a fill head separated from the container. FIG. 2B is a diagrammatic, cross-sectional view of the container of FIG. 2A with a fill head secured to the container.

As illustrated in FIGS. 1A and 1B, container 102 may be in the form of a right circular cylinder. The outer diameter (A) of container 102 may be approximately 75 inches in some embodiments. Other diameters may be used as necessary or desired. Additionally, the container 102 may have a height (B) of approximately 45 inches or 81 inches in some embodiments, but other heights may also be used.

In some embodiments, the container 102 may utilize an ASC-200 container made by AVANTech, LLC in order to hold 173 cubic feet of grout at a 95% fill. However, other containers may be provided having a disposal volume of 130 cubic feet and may hold 101 cubic feet of grout at a 95% fill, with such an alternative container having a weight of approximately 14,600 pounds in an example. Additionally, the containers 102 may comprise ⅜ inch carbon steel in some embodiments, but other suitable materials and thicknesses may be used as necessary or desired. In one example embodiment, the internal volume of the containers 102 may be 106 cubic feet. Empty containers 102 may have a weight of approximately 2,125 pounds, and the containers 102 may obtain a max gross weight of approximately 14,680 pounds when filled with solidification materials and/or waste. However, a container 102 having a different size and maximum weight may be used as well. For example, an empty container 102 may weigh of approximately 3,770 pounds, and a filled container 102 may weigh approximately 24,000 pounds in some embodiments. Fasteners 136 may be configured to permit attachment of lifting cables to assist in lifting the containers 102.

Looking now at FIGS. 2A and 2B, a container 102 and a fill head 104 are illustrated. A motor 112, which in some embodiments may be a hydraulic motor, may be associated with the fill head 104. In some embodiments, the motor 112 may be a hydraulic motor. The motor 112 may be configured to generate rotation of the mixing impeller 106 inside the container housing. In this embodiment, the mixing impeller 106 may include an axial shaft 130 to which one or more blades 132A, 132B are attached. The motor 112 may be configured to engage shaft 130 so as to generate rotation of the shaft 130.

As shown, primary blades 132A may be longer than the secondary blades 132B. In this embodiment, two primary blades 132A are connected to the shaft 130 at the same height and spaced apart by 180 degrees. Additionally, in the illustrated embodiments, four secondary blades 132B may be connected to the shaft 130 at the same height and spaced apart by 90 degrees. Such pairs of primary blades 132A are provided at four levels in this embodiment, with three sets of secondary blades 132B being provided at levels between them. However, the blades 132A, 132B may be shaped and/or distributed differently in other embodiments. An interconnect structure, such as the structure indicated at 132C, may be attached to distal ends of the primary blades 132A to provide additional strength and stability.

As noted above, the fill head 104 may be used to generate rotation of the shaft 130, i.e., to generate a torque on the shaft 130 via motor 112 so as to mix individual or pre-mixed solidification materials. In some embodiments, after solidification materials have been loaded into the container 102, the solidification materials may be mixed further in the container 102 by the mixing impeller 106. After liquid waste materials have been added and/or mixed, the fill head 104 may be removed and a closure lid 105 (FIG. 2A) may be secured to the container 102. The fill head 104 may be operated remotely in some embodiments. Further, an operator may remotely cause the closure lid 105 to be secured to or removed from the container 102. In some embodiments, the motor 112 may be configured to rotate the shaft 130 with a speed of approximately 60-80 revolutions per minute. However, other rotational speeds may also be used for the shaft 130. Where bigger containers 102 are used, the required rotational speed may be lower.

Dry solidification materials may generally have a higher resistance to impeller movement than occurs after the addition of aqueous waste material. Solidification materials may include blast furnace slag ("BFS"), fly ash, calcined clay, Portland cement, and/or other materials. Solidification materials may occupy approximately 90 percent of the internal volume of a container 102, and, where solidification materials are pre-loaded into the containers 102 before any waste material is introduced to the container 102, the overall resistance to impeller movement in the container 102 may be high. To account for this, the motor 112 may be configured to rotate the shaft 130 with approximately 2,000 lb-ft or more of torque (e.g., at least approximately 3000 lb-ft of torque). This torque may permit the shaft 130 and the connected blades 132A, 132B to move through solidification materials and/or the waste material to enable mixing of the materials.

To provide a system that is configured to operate at such torques, several potential features may be provided. For example, the shaft 130 and blades 132A, 132B of the mixing impeller 106 may be made sufficiently thick and sturdy, and the hydraulic power unit 414 (see FIG. 4) may be configured to operate at a sufficient level of power. Other modifications may also be made to account for the high torque requirements. For example, the container 102 and the fill head 104 may be made sufficiently sturdy, and the wall thicknesses of the container 102 may be increased at certain locations to mitigate warpage under higher torques.

Alternatively, the system may be configured to reduce the amount of torque required. This may be done by providing a smaller container or by increasing the speed of the mixing impeller 106 to reduce the blade length and torque required. Air may also be injected through lower piping to loosen and expand the solidification materials, and this may also reduce the density of solidification materials as well as the torque required for mixing.

In some embodiments, one or more internal channels 139 (FIG. 2A) may be provided within the container 102, and the internal channels 139 may be configured to receive waste material. For example, the internal channels 139 may be formed by pipes that are positioned at the interior walls of the container 102. The internal channels 139 may be configured to extend to one or more outlets 131 at which the waste material may be introduced into the internal volume of the container 102. Internal channels 139 may be in communication with a waste feed port 133 (see FIG. 2B) so that material introduced at the waste feed port 133 flows through the internal channels 139 to the outlets 131. In some embodiments, at least a portion of the internal channels 139 is provided as small bore fill piping. The piping may be provided in various sizes, including, for example, a 1-inch diameter or a 1.5-inch diameter. However, internal channels 139 may be provided in other forms and in other sizes. In some embodiments, the pipes may be provided along the contours of the container 102. For example, pipes may be welded to the inside of the container 102, and this may secure the pipes in place so that they do not come loose as the internal mixing impeller 106 is operating. However, other approaches may be used to attach the pipes.

By providing outlets 131 at various positions including different elevations within the container 102, waste material may be more evenly distributed as it is introduced into the container 102. This may be advantageous for several reasons. First, the solidification materials may account for approximately 90 percent of the internal volume within the containers 102 in some embodiments, so simply introducing waste materials at one location may lead to poor distribution. Additionally, even after waste material is introduced into the container 102, the waste material typically will be mixed with solidification materials to form a homogenous mixture. Where waste material is introduced only at one location within the container 102, formation of a homogenous mixture will take longer, reducing the efficiency of operations.

Looking now at FIG. 2B, various features of a fill head 104 that may be used at an on-site facility are illustrated. The fill head 104 may provide an operational, mechanical, and control interface between a container 102 and other on-site components. The fill head 104 may include remote drive(s) for engaging and locking the fill head 104 to a container 102. For example, various aspects of fill head 104 may be defined or otherwise supported by a base plate 150. In this regard, the fill head 104 may have a liquid waste feed port 133, which may itself have an isolation valve. The fill head 104 may also have a hydraulic drive motor 112 that is driven by a hydraulic power unit. The fill head 104 may have a balanced hoist point so that the fill head 104 may be raised and lowered from the storage stand or moved between the storage stand and the container 102. The fill head 104 may also include a valve manifold that directs flow to nozzles for distributing flow within the container 102. A wheeled dolly storage stand may be used for storage of the fill head 104. A vent line 124 may be provided including a heated HEPA filter.

Figure 4:
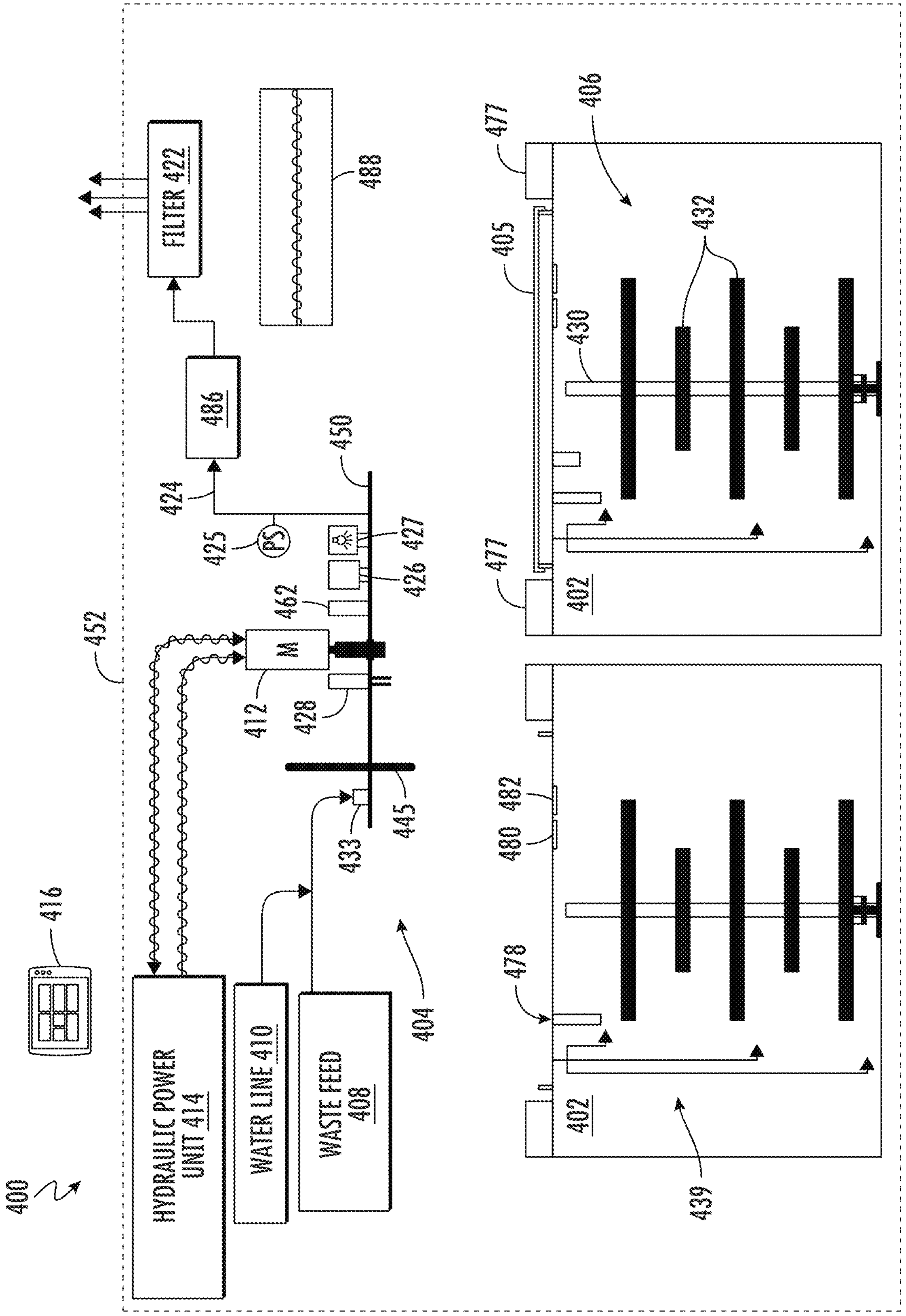
FIG. 4 is a diagrammatic view illustrating an example fill head with containers at an on-site facility, in accordance with an embodiment of the present invention.

The on-site facility may include various types of equipment and features to assist in the storage and disposal of materials. In this regard, the on-site facility may include tanks for storing radioactive waste and pumps for transferring radioactive waste. The on-site facility may also include an area for receiving containers 102 pre-loaded with solidification materials and equipment for unloading and moving these containers 102 (e.g., forklifts). As shown in FIG. 4, the on-site facility may include an enclosure 452 having a conveyance, the enclosure 452 being used to house and transfer pre-loaded containers 402 (which may be like containers 102). For example, containers 402 may be located in enclosure 452 while radioactive waste is mixed with solidification materials, as well as during grout curing, final inspection, and lidding of the container 402. The comparatively small footprint of the on-site portion of the system may also facilitate the use of an enclosure 452 in the form of a portable building structure or a transportable enclosure for housing on-site equipment, thus eliminating the need for a "stick-built" onsite grouting facility. The enclosure 452 may have a heating and cooling source 488 to control the temperature and/or humidity in the enclosure 452. The side walls of the enclosure 452 may have one or more roll up or hinged doors that are located adjacent to the container 402. The doors may provide access for installing or removing a container with a forklift or equivalent conveyance.

The on-site facility may also include a fill head 404 (e.g., like fill head 104), a motor 412 (like motor 112), and other ancillary components that may be used to induce the flow of radioactive waste materials into the container 402 and to mix the contents of the container 402. The on-site facility may also include a loading area for loading the grout filled containers 402 onto a truck-trailer or another vehicle for transport to a storage area or disposal site. In this regard, various types of equipment such as a forklift and/or one or more hoists may be provided at the loading area.

The two-stage approaches described in several embodiments herein allow for various operations to be performed at an off-site facility. In this regard, various types of equipment may be provided at the off-site facility for receipt, handling, and measurement of the solidification material. The off-site facility may have a material offload area where raw solidification materials are offloaded, inspected, and accepted. Solidification materials may comprise raw cementitious material and/or related material. The off-site facility may have air handling and air filtration equipment to control dust created by transferring solidification materials. The off-site facility may also have conveyors, forklifts, overhead hoists, or similar equipment for loading containers onto a truck to move preloaded containers to a nuclear facility.

Figure 3:
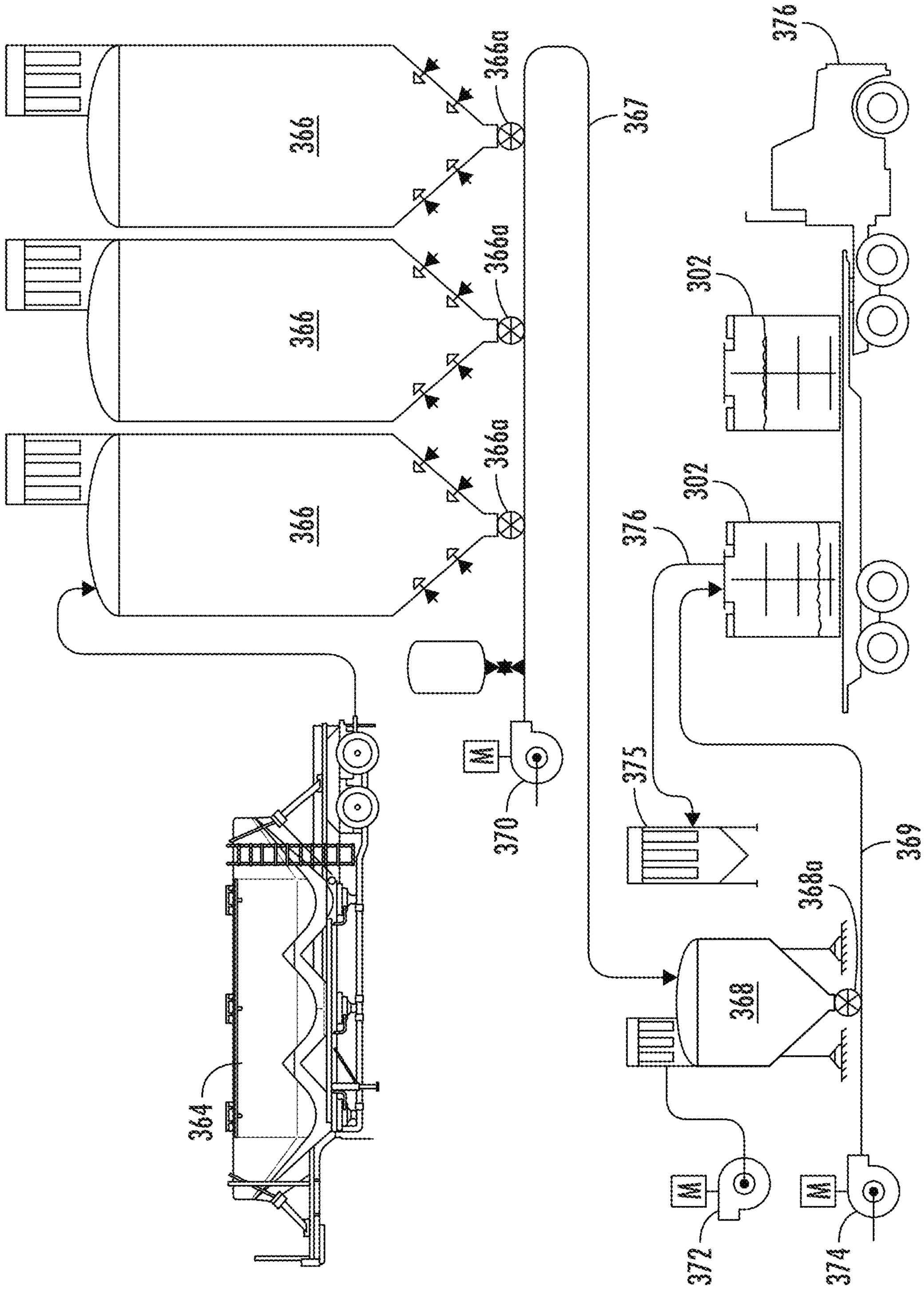
FIG. 3 is a diagrammatic view illustrating example equipment that may be provided at an off-site facility, in accordance with an embodiment of the present invention.

FIG. 3 is a diagrammatic view illustrating example equipment that may be provided at an off-site facility. In this regard, various ingredients for the solidification materials may be transported to the off-site facility such as via a trailer 364. The ingredients may be transferred from the trailer 364 into one or more storage containers (e.g., a receptacle, bin, silo, or the like). Three silos 366 are provided in FIG. 2A, but a greater or lesser number of silos 366 may be provided in other embodiments. Bins and warehousing areas may also be provided for storage of solidification materials in some embodiments.

In some embodiments, the silos 366 may each be used to hold a separate component (e.g., ingredient) of the solidification materials, and the number of silos 366 may correlate to the number of components used. For example, one silo may contain BFS, another may contain fly ash, and a third silo may contain Portland cement. However, other solidification materials may be used including calcined clay and/or other materials. The various ingredients of the solidification materials may be transported from the silos 366 to a mixer 368 so that the ingredients can be mixed together. For example, the mixer 368 may be used to create a homogenous dry-blend of solidification materials. After solidification materials have been mixed, the material may be transported to containers 302 (which may be, for example, similar to containers 102) and transported by truck 376 or by another vehicle to a location on-site at a nuclear facility so that waste material may be added to the solidification material.

The off-site facility may also have transfer equipment for moving solidification materials from storage to weigh bins and mixing vessels. This transfer equipment may include various pumps, blowers, tubular drag chain conveyors, augers, and/or other equipment. For example, in FIG. 3, one or more displacement blowers are used to assist in transporting solidification materials from one location to the next. In this regard, a first displacement blower 370 may urge various ingredients from the silos 366 to the mixer 368. Each silo 366 may, for example, have a valve **366*a* that opens to allow the material to fall into a conduit 367. The material is moved along conduit 367 into the mixer 368 by the blower 370**.

A second displacement blower 372 may be provided to facilitate removal of air from the mixer 368, leaving behind the solidification materials. Additionally, a third displacement blower 374 may be used to urge mixed solidification materials from the mixer 368 to respective containers 302. Toward this end, mixer 368 may be equipped with a valve **368*a* which, when opened, allows the mixed solidification materials to fall into a conduit 369. The mixed solidification materials are moved along conduit 369 into the container 302 by the displacement blower 374. In this embodiment, air is exhausted from the container 302 into a bag house 375 via conduit 376. The solidification materials, in powder form, remain in the container 302. As one skilled in the art will appreciate, conduits 369 and 376 and may be connected to container 302** via respective quick-release couplings in some preferred embodiments.

Displacement blowers 370, 372, 374 may be used to pressure or vacuum-convey material from one location to the next. For example, the displacement blowers may operate at about 15 psi to convey material at a low line velocity to reduce flow resistance. However, the displacement blowers may operate at different pressures. The components illustrated in FIG. 3 may be controlled from a remote location such as a loadout control room without any local supervision in some embodiments.

As noted above, treatment and packaging systems located on-site at nuclear facilities in the past have typically been very complex. The two-stage approaches described in various embodiments herein may provide on-site treatment and packaging systems of reduced complexity. Referring now to FIG. 4, an example on-site treatment and packaging system 400 in accordance with the present invention is diagrammatically illustrated.

Containers 402 (which may be similar to containers 102) typically arrive from the off-site facility containing a predetermined amount of the solidification materials. The fill head 404 may have a variety of features, such as a waste feed port 433. In this case, waste feed port 433 is provided in base plate 450 and operatively connected to a waste feed line 408. When the fill head 404 is lowered to engage a container 402, waste feed port 433 may be configured to be operatively connected with internal channels 439 within the container 402. In this way, waste material may be introduced into the internal channels 439 so as to be distributed within the container 402. Notably, a water line 410 may be provided to flush the waste feed line 408 after all waste material has been transferred. A flow control valve, e.g., controlled by an operator at the control panel 416, may be associated with the waste feed port 433.

The fill head 404 may also comprise a camera 426 and/or a level indicator 428. The camera 426 may be a color camera having an accompanying light source 427. The fill head 404 will frequently be operated remotely, and this camera 426 may allow operators to effectively position the fill head 204 and manage waste filling operations. The level indicator 428 may be configured to determine the level of solidification material and/or waste material in the container 402. In some embodiments, the level indicator 428 may be configured to detect the level of material continuously or when the level of material has reached a specified threshold.

In the embodiment shown in FIG. 4, an internal mixing impeller 406 having a shaft 430 and blades 432 may be provided in each container 402. The motor 412 and an associated hydraulic power unit 414 are provided to generate sufficient torque on the shaft 430 in order to mix the solidification materials and/or the grout. The hydraulic power unit 414 may be provided in an ancillary enclosure, and this ancillary enclosure may include an exhaust fan, heating, a service water tank, and an air compressor, as necessary or appropriate.

A control panel 416 may be utilized by an operator to control remotely the operation of the fill head 404 and other components of the system 400. For example, the control panel 416 may be connected via communication lines to valves associated with the water line 410, the hydraulic power unit 414, the camera 426, the level indicator 428, and other components. The control panel 416 may preferably be provided outside of the enclosure 452.

In some embodiments, a vent line 424 may be provided at the fill head 404 so as to permit gases to move to a filter 422. The filter 422 may, for example, be a HEPA filter in some cases. A heating element 486 may be provided to encourage upward movement of gases to the filter 422. In addition, a pressure sensor 425 may be provided to determine the pressure of gases in the vent line 424. A vent outlet 482 may be provided at the container 402 for fluid communication to the vent line 424 when the fill head 404 is positioned on the container 402. Fill head 404 may also include one or more alignment pins 445 received in a corresponding alignment aperture 478 in the container 402. Fill head 404 may also include a temperature indicator 462 (e.g., provided proximate to the middle of the fill head). This temperature indicator 462 may be connected to thermocouple.

As also shown in FIG. 4, the container 402 may also include a viewing section 480 that may comprise transparent material. The viewing section 480 may permit light from the light source 427 to shine into the container 402, and may also permit the camera 426 to capture video or images of the inner contents of the container 402. Additionally, a closure lid 405 may be provided and secured to the containers 402 after the containers 402 have been filled and mixed with the appropriate amount of waste material. In some embodiments, the container 402 may have forklift pockets 477 to facilitate container lifting and movement with a forklift or the like, thus eliminating the need for overhead cranes.

Figure 5A:
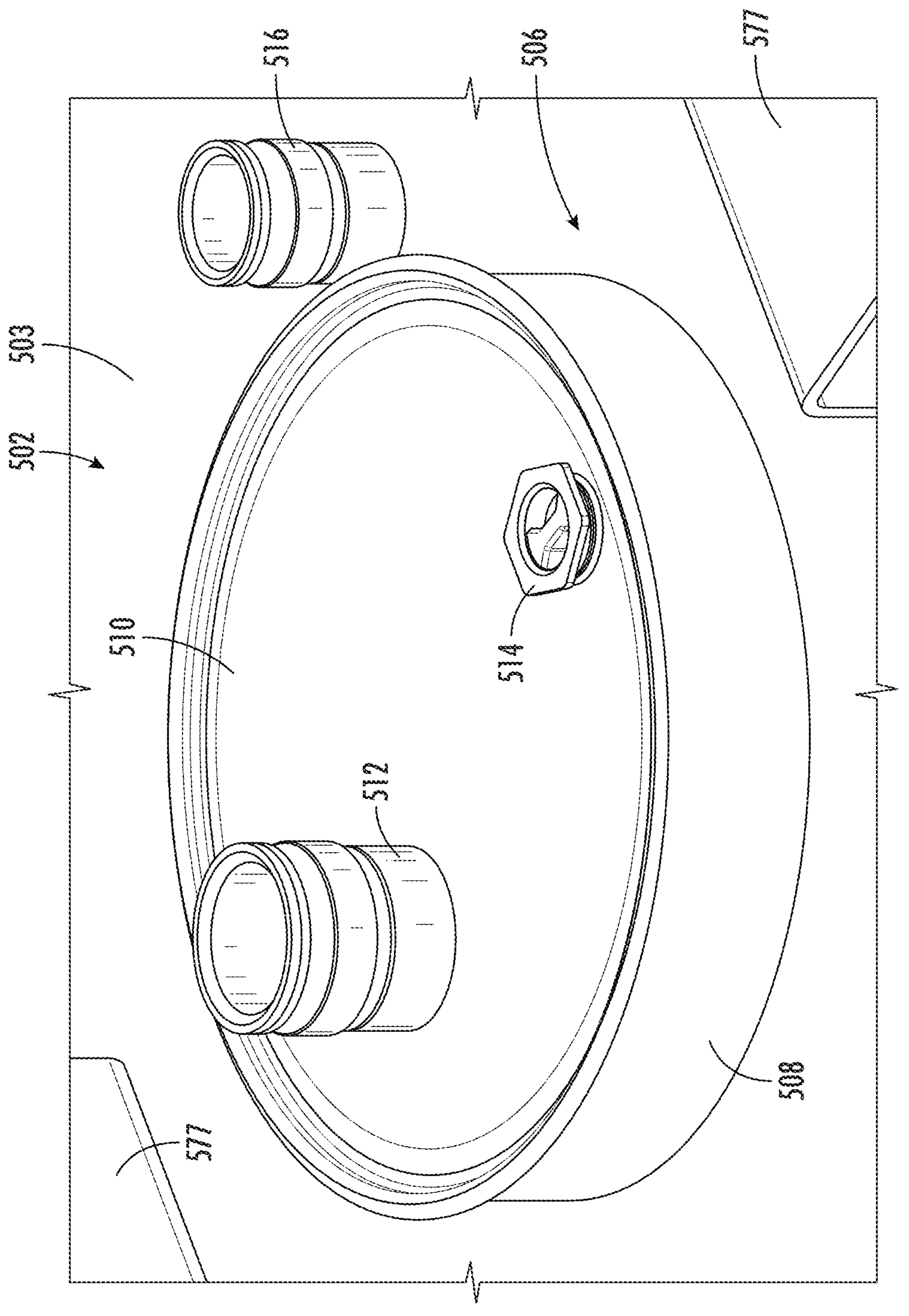
FIG. 5A is a top perspective view showing a drum cover in position on the fill plate matching structure of a container, in accordance with an embodiment of the present invention.

Further details can be most easily explained with reference to FIGS. 5A through 5J. Referring first to FIG. 5A, the top 503 of a container 502 (which may be similar to container 102) is illustrated. The top 503 has a matching structure 506, in this case delimited by a rim 508, for engagement by a fill head. A drum cover 510 is fitted on the rim 508 to cover the various openings in the matching structure. The drum cover 510 may, however, have one or more vents such as those indicated at 512 and 514. Vent 512 allows connection of a conduit such as conduit 376 for escape of air as the container is being filled with solidification materials. Vent 514 is a passive vent filter in this embodiment which is intended to prevent pressure build-up due to temperature changes. The solidification materials are themselves introduced into the container via connection of a supply conduit (e.g., conduit 369) at port 516. As noted above, vent 512 and port 516 may be configured to mate with a quick-connect coupling to facilitate connection and disconnection of the respective conduits. A portion of forklift pockets 577 can also be seen in FIG. 5A.

Figure 5B:
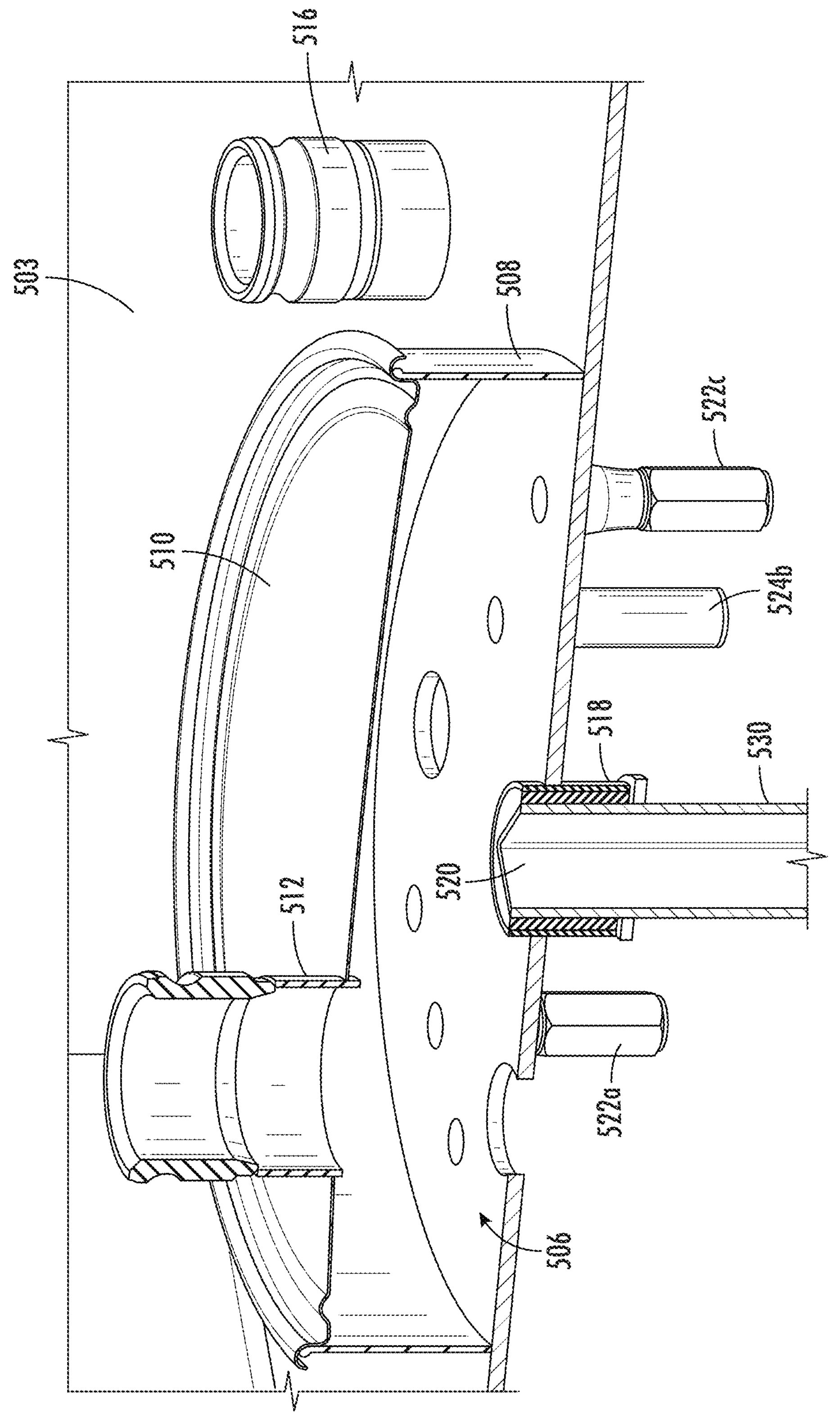
FIG. 5B is a cross-section of the drum cover and fill plate matching structure of FIG. 5A.
Figure 5C:
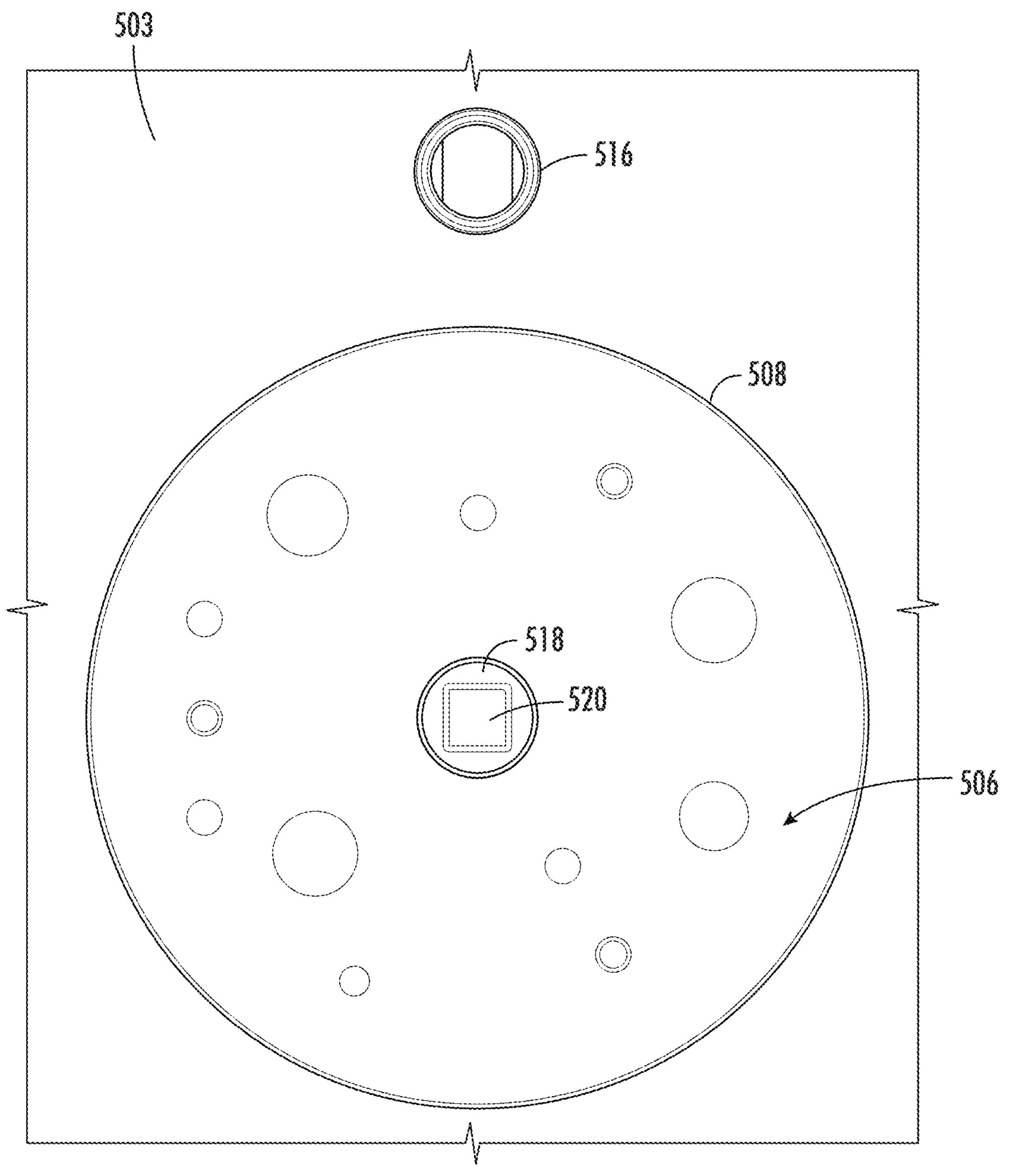
FIG. 5C is a top plan view of the portion illustrated in FIG. 5A but with the drum cover removed.

Certain additional details can be seen in the cross-sectional view of FIG. 5B and the top plan view with drum cover 510 removed of FIG. 5C. As shown, shaft 530 of the impeller inside container 502 is seated for rotation in a bushing located in the matching structure 506. Shaft 530 defines a configured opening 520 (e.g., square) at its upper end which is engaged by a rotating driver of the motor when the fill head is in use. As noted above, the top 503 of container 502 defines various openings at the matching structure 506 for engagement by the fill head. The purpose of these openings relative to the fill head is described more fully below. When cover 510 is in position, however, one or more of these openings may allow escape of air through the vent 512 and/or vent 514.

Figure 5D:
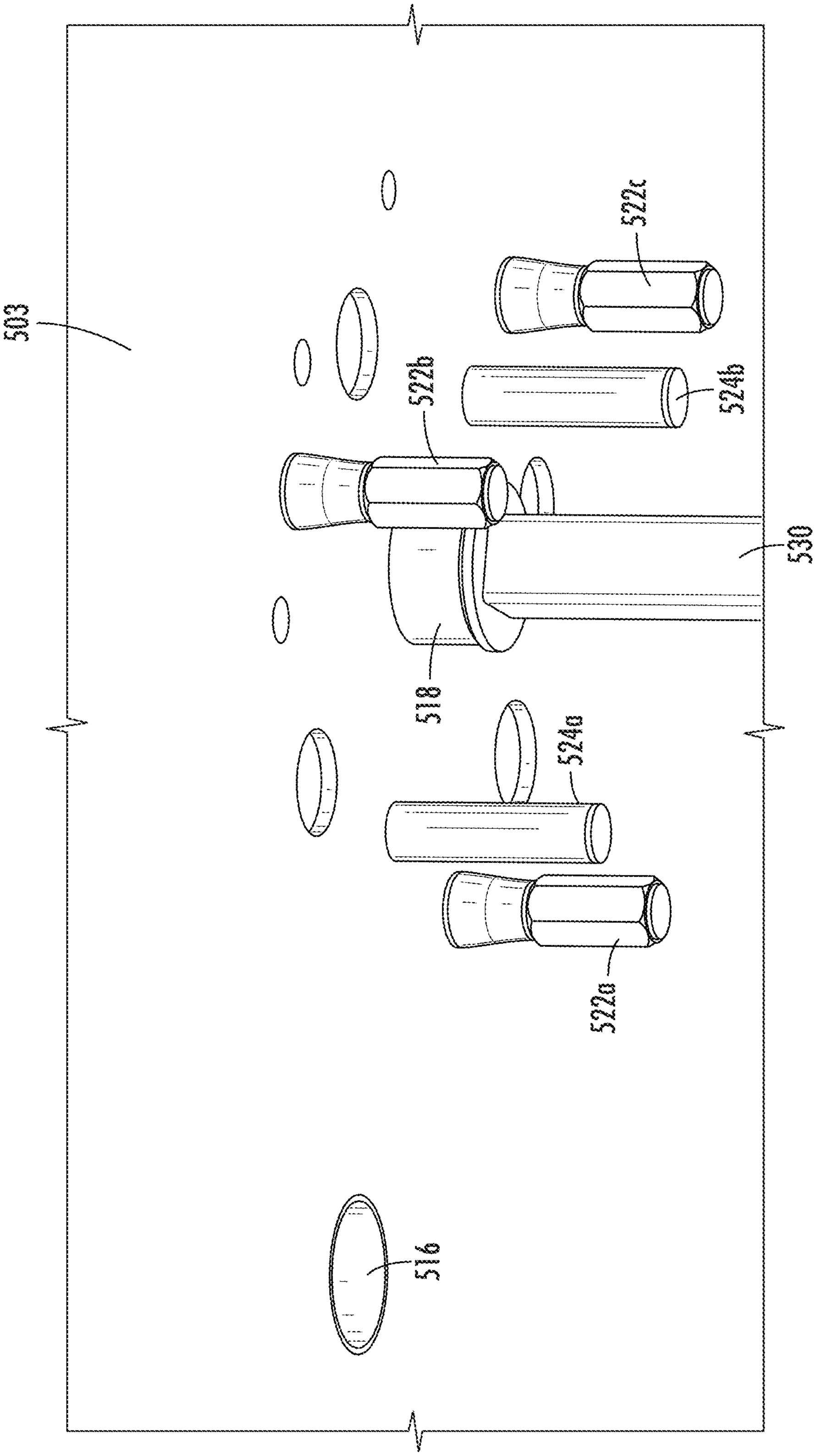
FIG. 5D is a bottom perspective view of the container cover at the fill plate matching structure, in accordance with an embodiment of the present invention.

FIG. 5D illustrates the underside of top 503 at and near the matching structure. As shown, several screw receptacles, indicated at 522*a-c*, depend from the bottom of top 503. Receptacles 522*a-c* are engaged by screws carried by the fill head to effect secure engagement of the fill head and matching structure when the fill head is in use. Additional receptables 524*a-b* are adapted to receive respective alignment pins of the fill head.

Figure 5E:
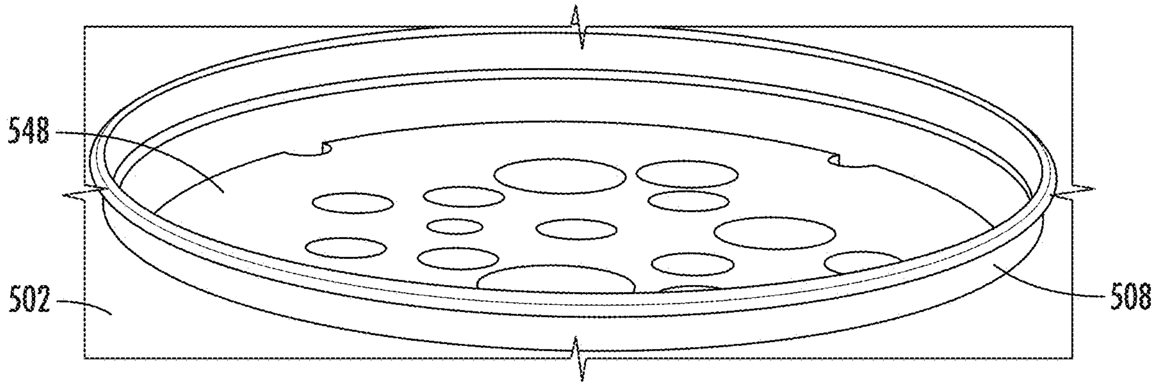
FIG. 5E is a perspective view of the matching structure of the container with the cover removed, in accordance with an embodiment of the present invention.

As shown in FIG. 5E, a gasket 548 may be fitted into rim 508. Gasket 548 may preferably be made of a suitable elastomeric material to form a seal with the fill head when the fill head is in use at the matching structure. Such a gasket 548 may assist in ensuring that waste material and/or solidification material does not escape into the surrounding environment. It will be appreciated that gasket 548 should itself define various openings aligning with openings or components of the fill head and/or the matching structure, as necessary or desired.

Figure 5F:
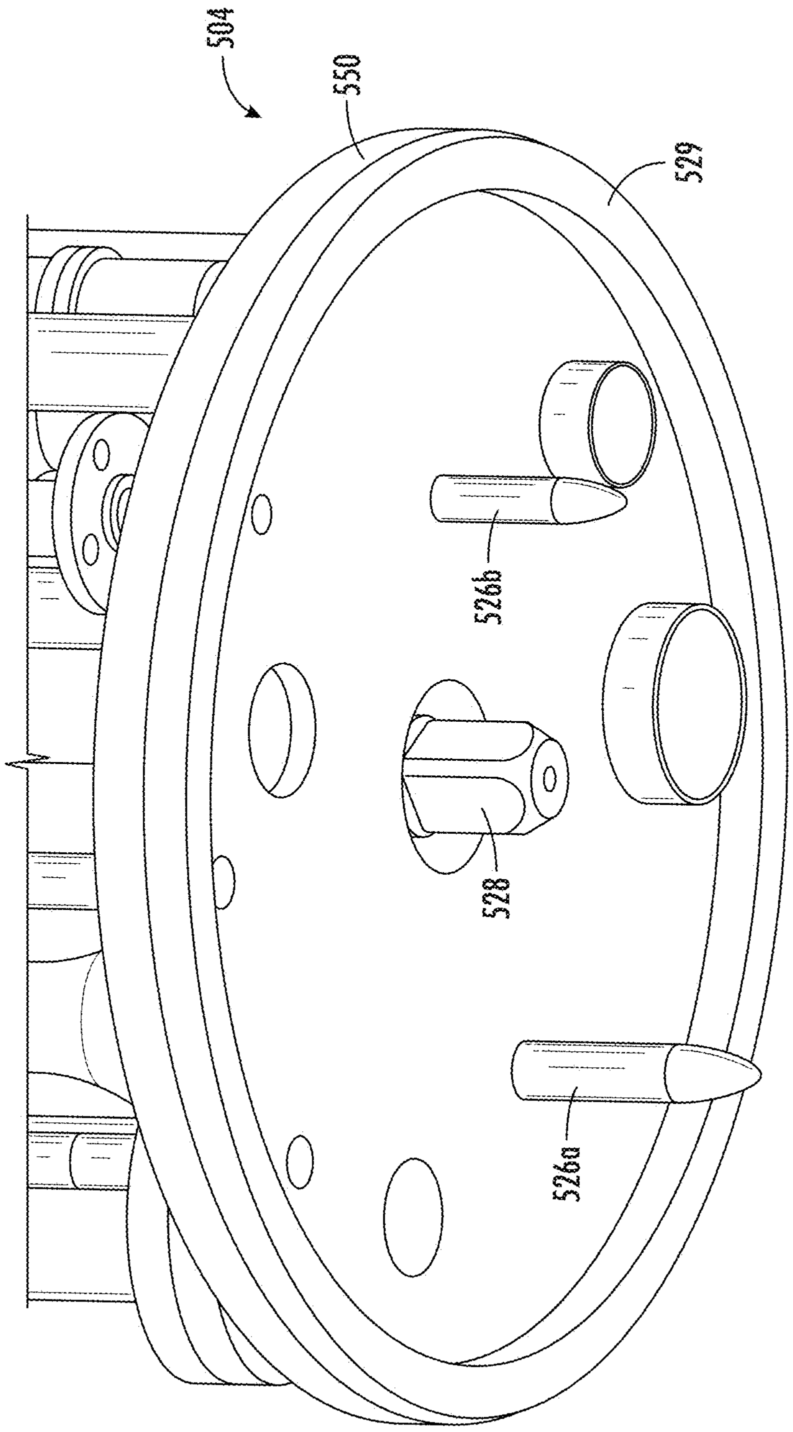
FIG. 5F is a bottom perspective view of a fill head that may be used to fill the container with liquid waste material, in accordance with an embodiment of the present invention.

FIG. 5F illustrates the underside of a fill head 504 with may be brought into engagement with the gasket 548 on the matching structure 506 of container 502. As shown, fill head 504 has a base plate 550 defining various ports and depending structures. For example, a pair of alignment pins 526*a-b* depend from base plate 550 for receipt in receptacles 524*a-b*, respectively. Note that pin 526*a* is longer than pin 526*b* in this embodiment to ensure that the fill head can be fully seated in only one orientation. Driver 528, which in this case has a square configuration, engages the open end 520 of shaft 530 for rotation. An annular seal 529, e.g., formed of a suitable elastomeric material, extends around the periphery of base plate 550 in this embodiment.

Figure 5G:
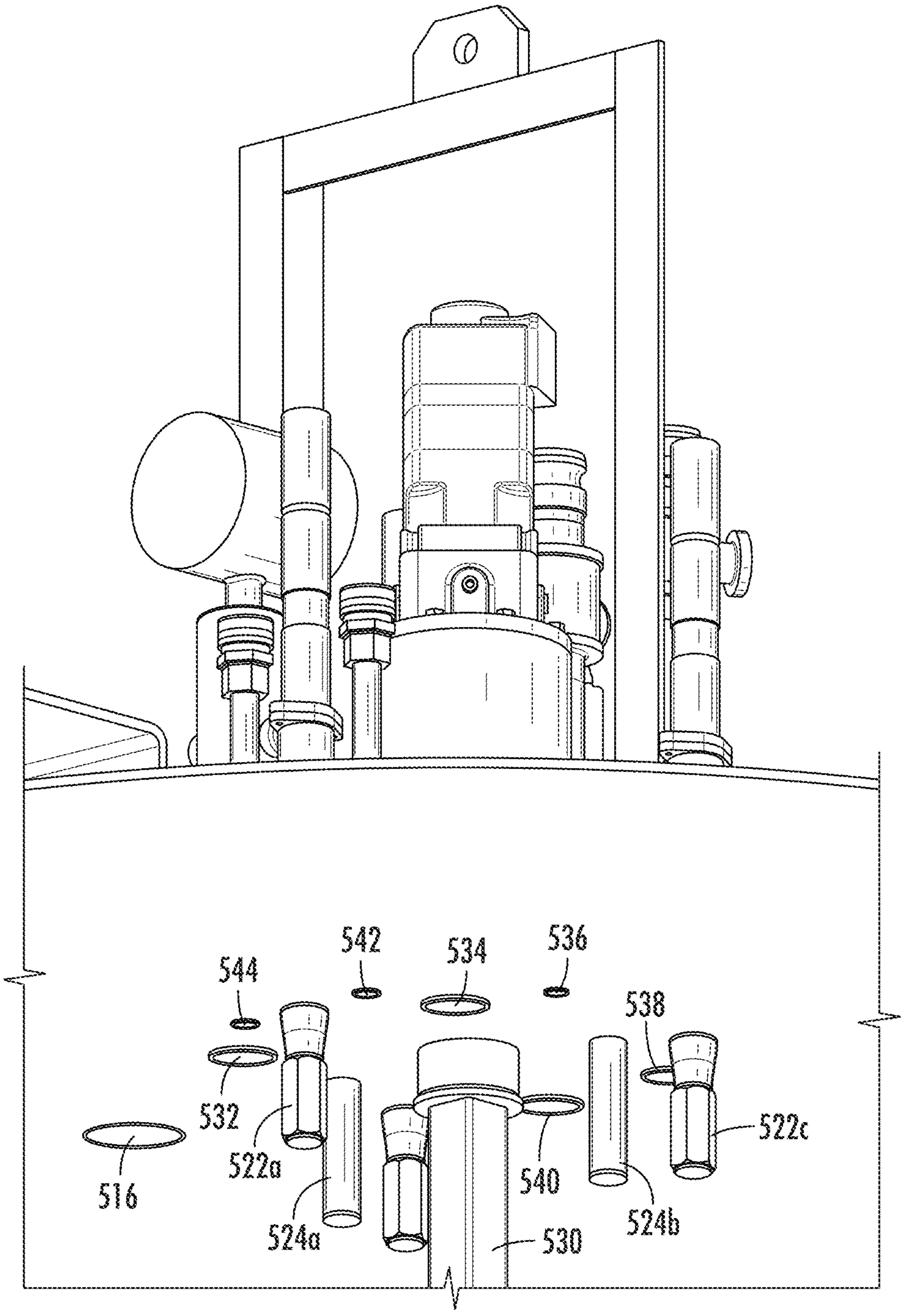
FIG. 5G illustrates the fill head of FIG. 5F in engagement with the matching structure of the container.
Figure 5H:
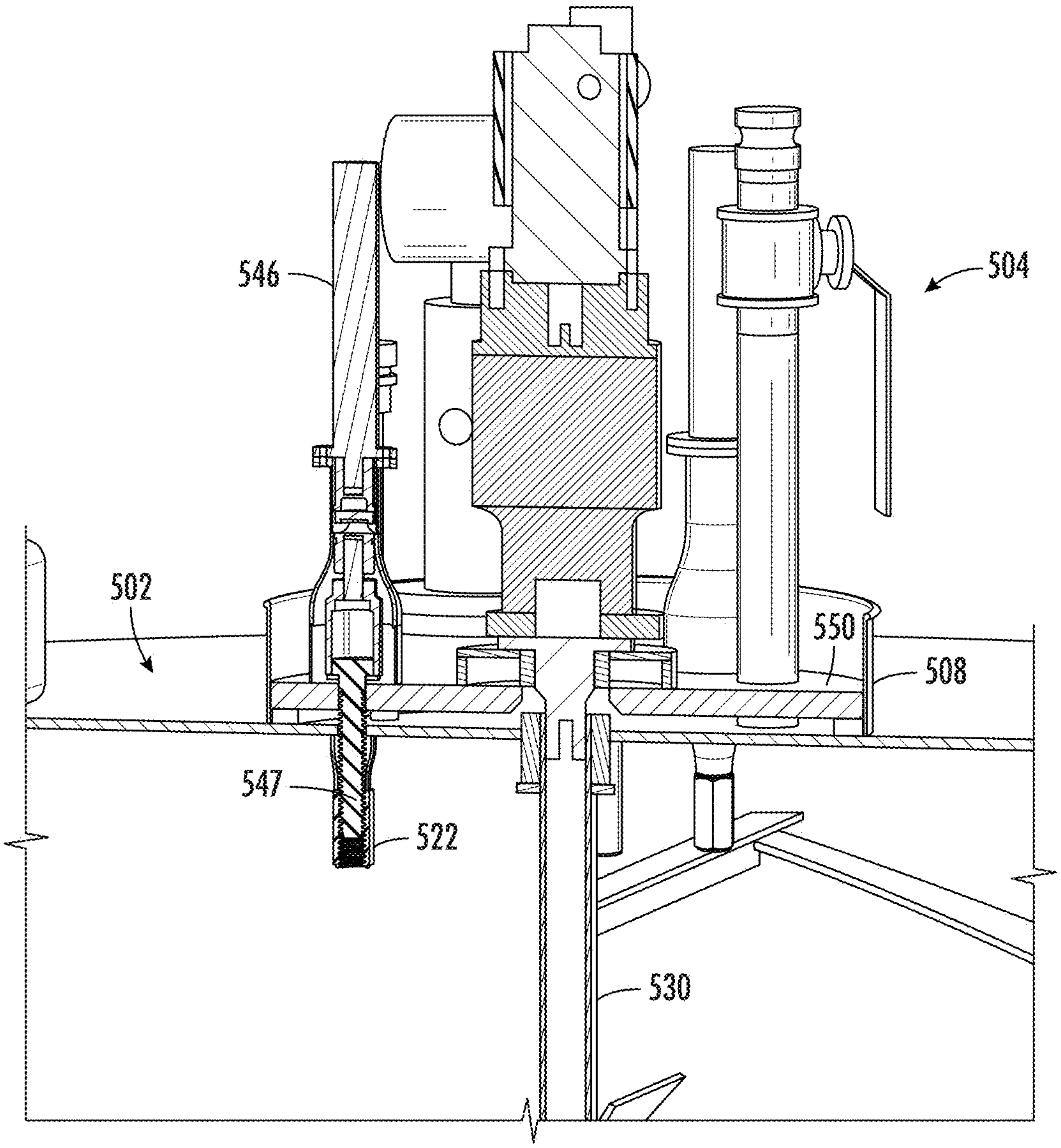
FIG. 5H is a cross-sectional view of the fill head in position on the container matching structure, showing tightening of a connecting screw.
Figure 5I:
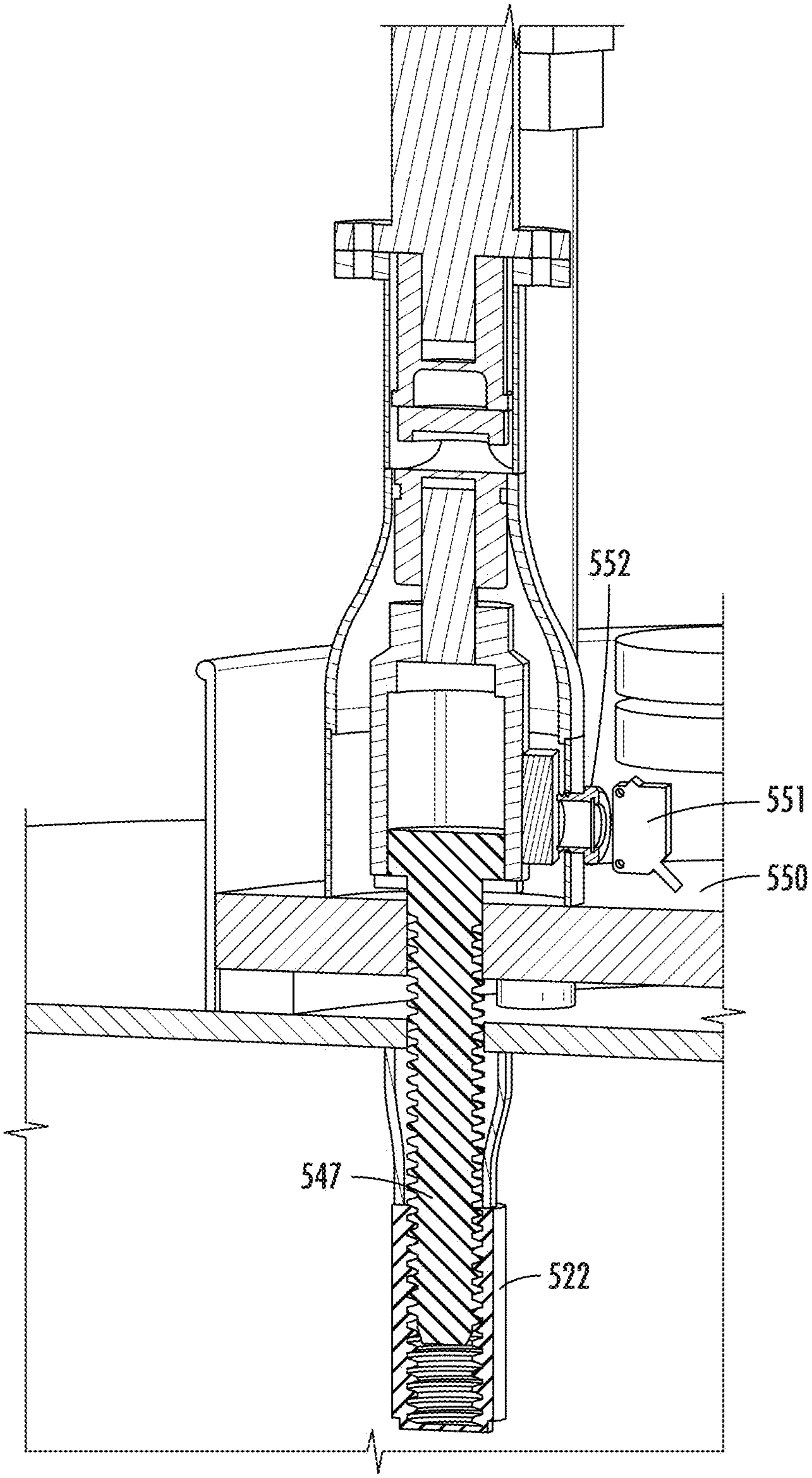
FIG. 5I is an enlarged view of the connecting screw of FIG. 5H and associated structure.

In FIG. 5G, the fill head 504 is shown engaged for use with the matching structure of container 502. Thus, various components of the fill head will be aligned with or engaging corresponding features of the container. For example, driver 528 is coupled for rotation with shaft 530. The alignment pins 526*a-b* are received in their respective receptacles 524*a-b*. The camera is located at camera port 532. A level indicating transmitter and level switch are located at ports 534 and 536, respectively. The waste stream is introduced at port 538 which, as described above, may be in fluid communication with internal piping of container 502. A HEPA filter vent is provided at 540. Ancillary water and ancillary air may be provided at ports 542 and 544, respectively.

As noted above, the fill head 504 may carry screws to secure it firmly with respect to the container 502. The manner in which such screws operate according to an embodiment of the present invention will now be described with reference to FIGS. 5H and 5I. First, the fill head 504 is placed in engagement with the matching structure of the container 502. The alignment pins align the fill head in the correct orientation. At this point, screws corresponding to each of the three receptacles 522*a-c* are retracted above corresponding threaded holes in the base plate 550. One or more suitable motors, such as air motor 546, are then actuated to drive the screws, such as screw 547, into their associated receptable 522. The screws 547 and base plate 550 are structurally strong and hold the torque of the fill head 504 during mixer operations. After mixing, the air motors are reversed to disengage the screws. The screws may be ACME screws in some preferred embodiments. In addition, omron sensors 551 may be added to each acme nut, including a sight glass for laser to detect target for counting number of revolutions.

In some embodiments, struvite precipitation reagents may be provided on-site at a nuclear facility. Hoppers, weigh bins, feeders, tanks, pumps, and other products may be provided for the storage and transportation of struvite precipitation reagents. In some embodiments, the struvite precipitation reagents may be used to pretreat the waste materials before introducing waste material into containers. The waste material may contain a high concentration of ammonium or ammonia that volatizes at elevated pH levels. To prevent the ammonia in the waste material from volatizing, the struvite precipitation reagents may be precipitated into the waste material prior to adding the waste material into containers. The struvite precipitation step may involve the use of magnesium sulfate, monosodium phosphate, and sodium hydroxide, and the step may last for approximately one hour.

Figure 6A:
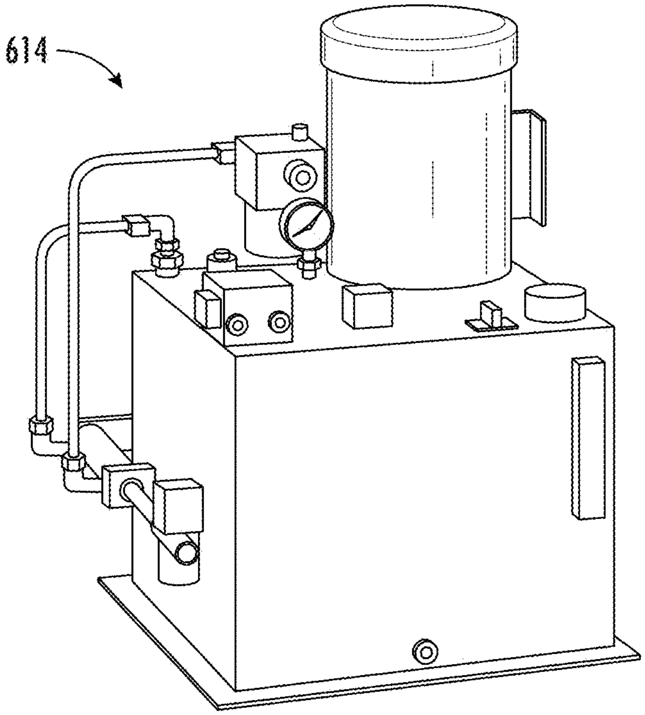
FIG. 6A is a perspective view of an example hydraulic power unit that may be used, in accordance with an embodiment of the present invention.
Figure 6B:
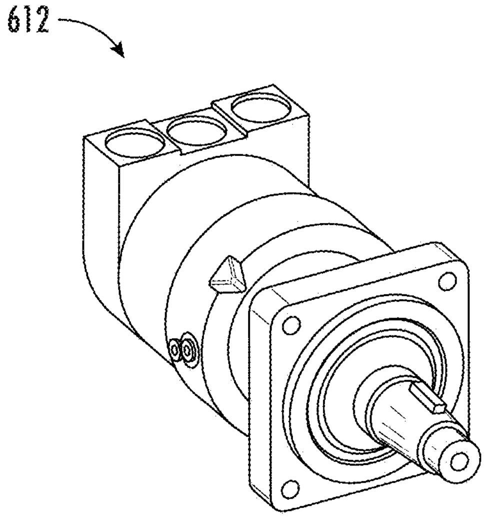
FIG. 6B is a perspective view of an example motor that may be used, in accordance with an embodiment of the present invention.

As noted above, the container's internal mixing impeller may be actuated using a motor and a hydraulic power unit. FIG. 6A is a perspective view of an example hydraulic power unit 614 that may be used, in accordance with an embodiment of the present invention, and FIG. 6B is a perspective view of an example motor 612 that may be used, in accordance with an embodiment of the present invention. The hydraulic power unit 614 may provide pressurized hydraulic fluid to the motor 612 located on the fill head. In some embodiments, the pressurized hydraulic fluid may be provided at 3,000 psi to 4,000 psi, although other appropriate pressures may be used as necessary or desired. The use of hydraulic power eliminates the need for a heavy electric motor on the fill head although embodiments are contemplated using, for example, electric motors. Hydraulic power also provides the capability to reverse easily the direction of the motor 612. As one skilled in the art will appreciate, hoses are typically used to route hydraulic fluid between the hydraulic power unit 614 to the motor 612. Control panel 416 (see FIG. 4) may be used to control the operation of the hydraulic power unit 614.

Figure 7:
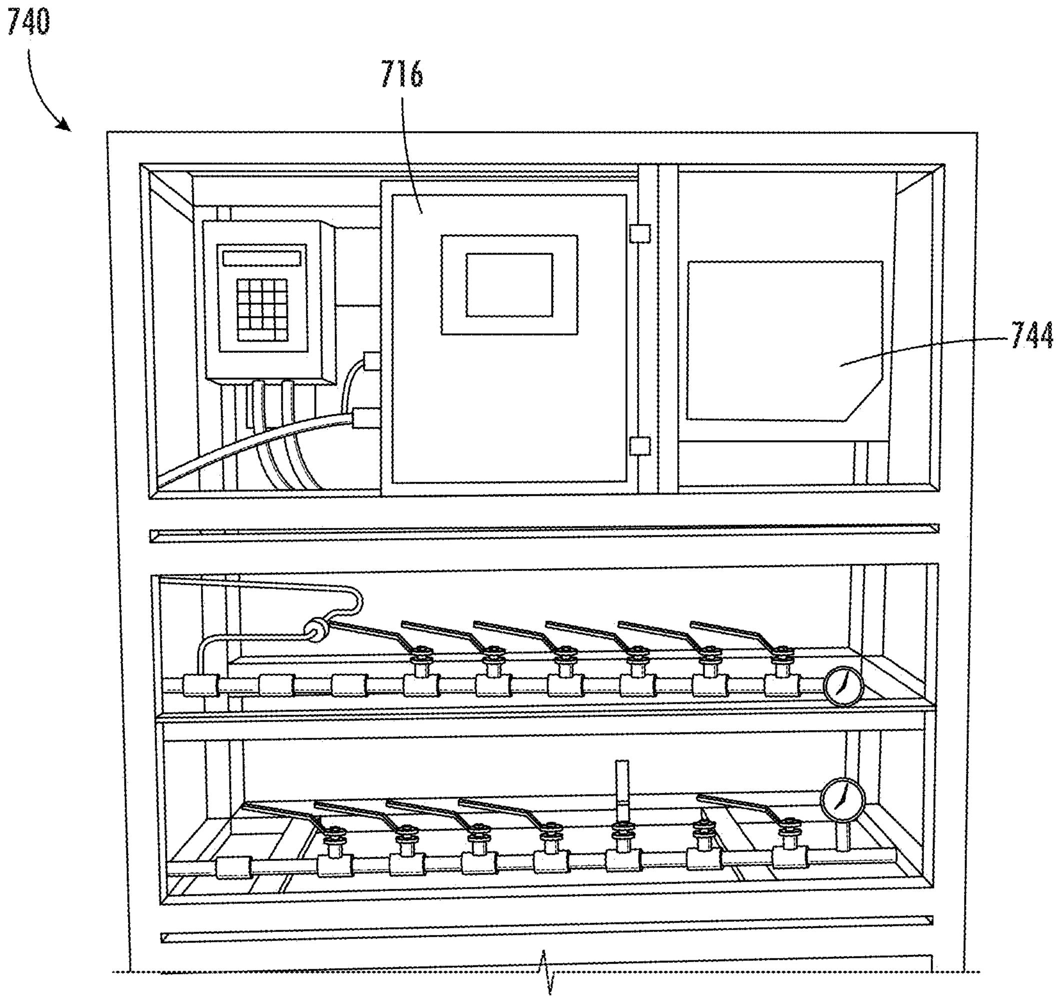
FIG. 7 is a front view of an example control skid that may be used for monitoring and operating the treatment and packaging system, in accordance with an embodiment of the present invention.

FIG. 7 is a front view of an example control skid 740 that may be used for monitoring and operating a treatment and packaging system in accordance with the present invention. The control skid 740 may include a control panel 716 (similar to control panel 416), a video monitor 744, and one or more instrument analyzers. The control panel 716 may include a human-machine interface (HMI), a programmable logic controller (PLC), and other components as necessary or desired. The control panel 716 may be used for various functions, including to operate and/or receive information from the water line or associated valves, the hydraulic power unit, the camera, the level indicator, and other components. The control skid 740 may be provided on-site or at a remote location in some embodiments. With the containers provided in an enclosure, an operator may effectively control the operation of the fill head (e.g., containers 402 and fill head within enclosure 452 of FIG. 4) from outside the enclosure.

The video monitor 744 may receive video feeds from one or more cameras and/or present other information such as graphical information, text, or qualitative information to allow the operator to make well-informed decisions while operating the system. The video monitor 744 may, for example, receive a video feed from a camera associated with the fill head (e.g., camera 426 of FIG. 4).

Figure 8:
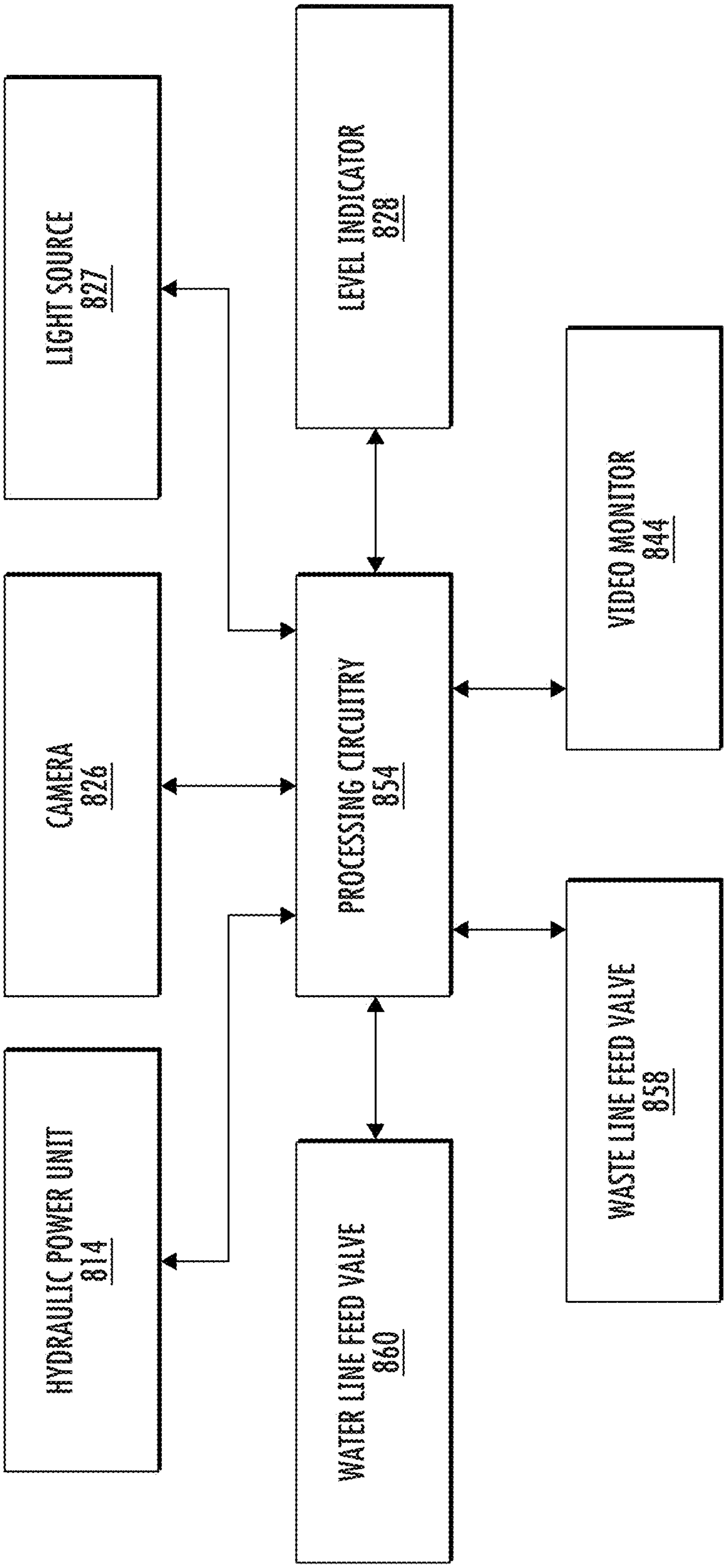
FIG. 8 is a block diagram illustrating an example treatment and packaging system with various connected devices, in accordance with an embodiment of the present invention.

FIG. 8 is a block diagram illustrating an example treatment and packaging system with various connected devices, in accordance with an embodiment of the present invention. The system includes processing circuitry 854, which may take a variety of forms as necessary or desired. For example, the processing circuitry 854 may include a suitable computing device, whether referred to as a controller, a microcontroller, a processor, a microprocessor, or some other name. In some embodiments, the processing circuitry 854 may be provided across multiple such components.

As shown, the processing circuitry 854 may be operatively connected with various components within the system. For example, the processing circuitry 854 may be connected to various valves such as the waste line feed valve 858 and the water line feed valve 860. Additionally, the processing circuitry 854 may be connected to various components on the fill head, such as a camera 826, a light source 827, and a level indicator 828. The processing circuitry 854 may also be connected to a video monitor 844 to enable images from the camera 826 to be presented on the video monitor. A hydraulic power unit 814 may also be connected to the processing circuitry 854. While various connections are shown in FIG. 8 between the processing circuitry 854 and other components, these connections may be rearranged in other embodiments, or additional connections between components may be provided. In addition, while various components are illustrated in FIG. 8, it should be understood that certain components may be added or removed from the system in various embodiments, as necessary or desired.

Figure 9A:
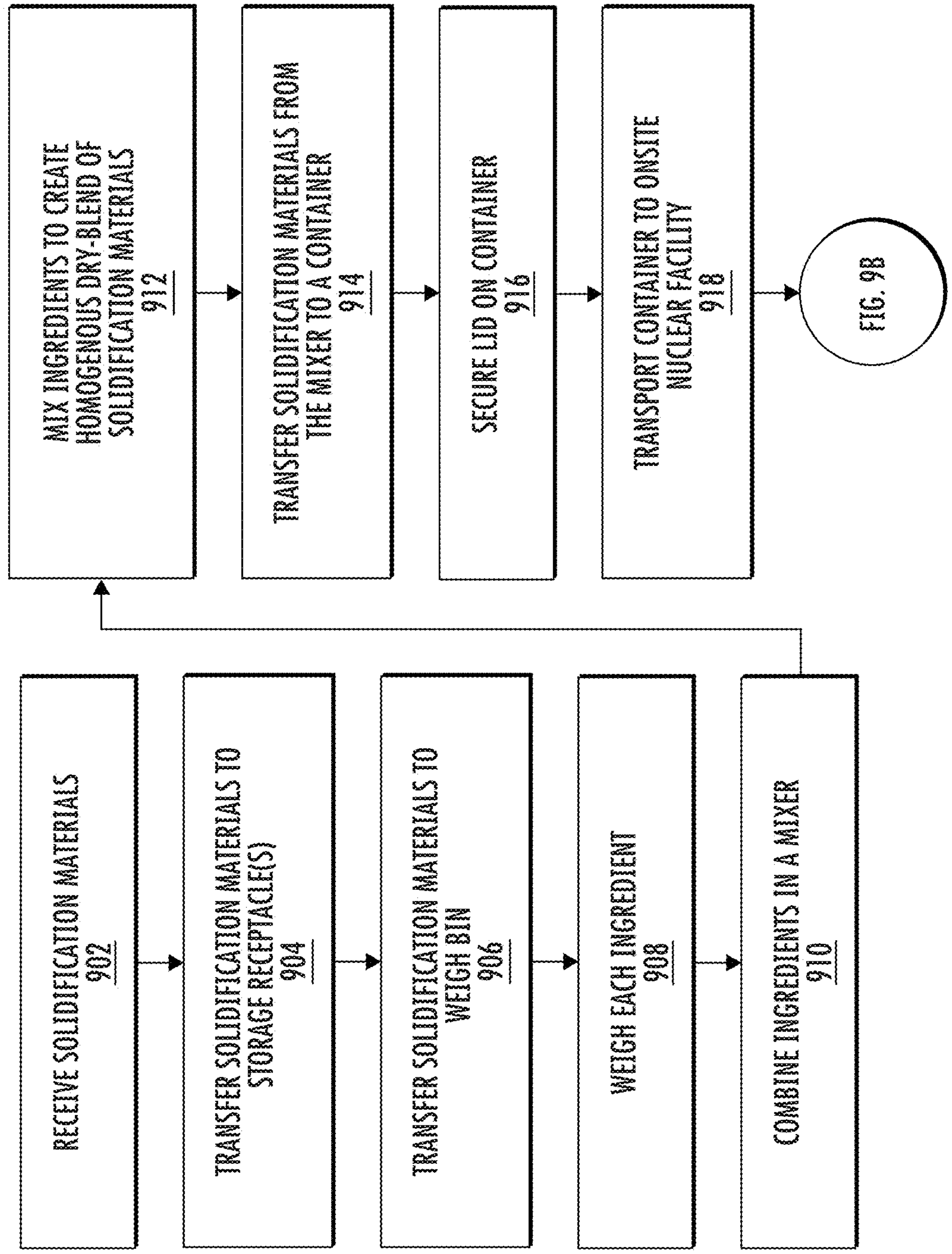
FIG. 9A is a flow chart illustrating an example method of loading containers with solidification materials, in accordance with an embodiment of the present invention.
Figure 9B:
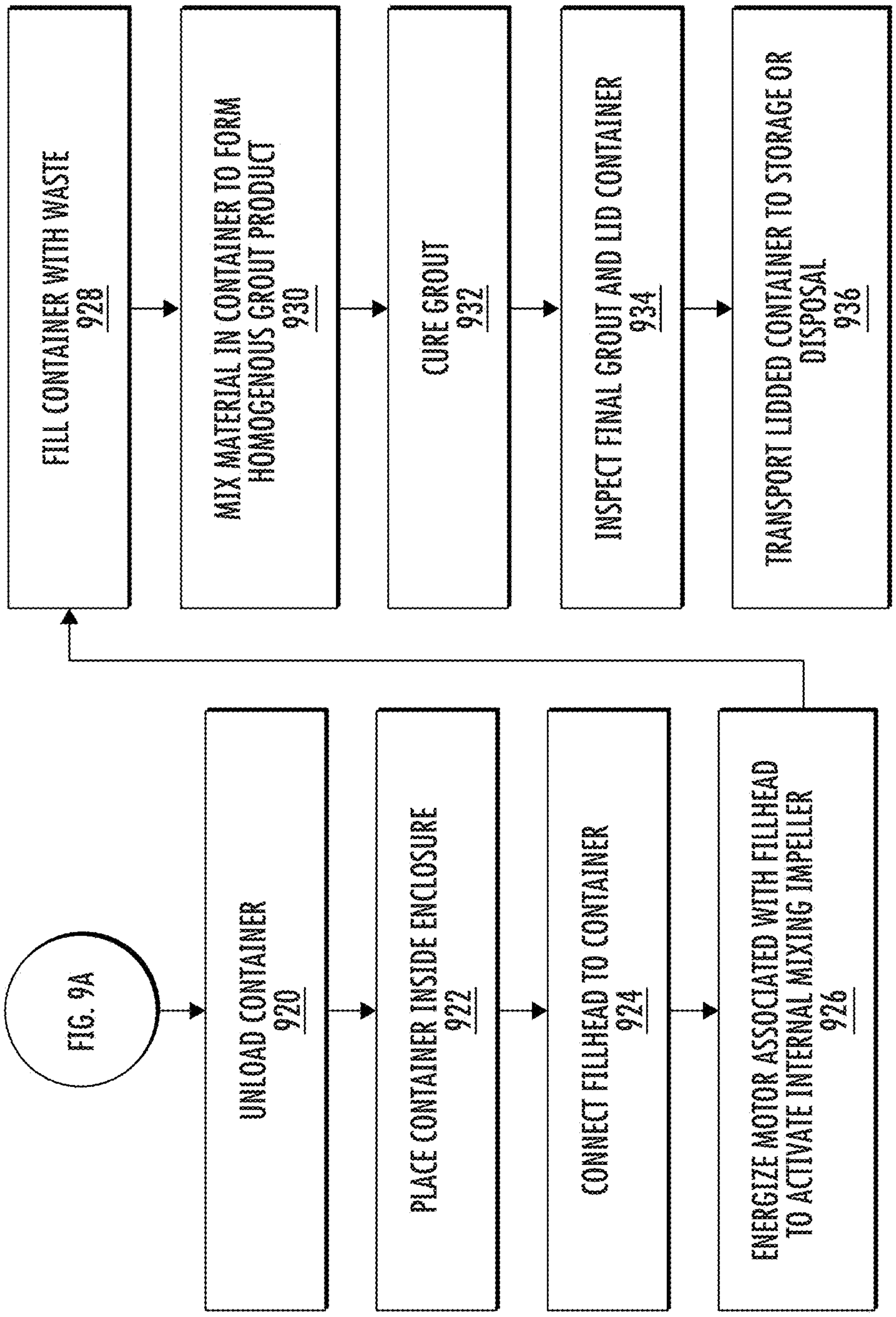
FIG. 9B is a flow chart illustrating an example method of transporting waste into containers, in accordance with an embodiment of the present invention.

FIGS. 9A and 9B show exemplary methodology providing a two-stage approach for solidification and disposal of waste material. In this regard, FIG. 9A is a flow chart illustrating an example method of loading containers with solidification materials, in accordance with an embodiment of the present invention. In some embodiments, the operations of FIG. 9A may preferably be performed at an off-site industrial facility rather than an on-site location at a nuclear facility.

At operation 902, solidification materials may be received. These solidification materials may be received as raw solidification materials, and various types of raw solidification materials may be provided. Raw solidification materials may include BFS, fly ash, calcined clay, Portland cement, and/or other materials. In some embodiments, the solidification materials may initially undergo quality control inspection to confirm that they meet specification requirements.

At operation 904, solidification materials may be transferred to storage receptacles such as silos. The different solidification material ingredients (i.e., different types of raw solidification materials) may be kept separate from each other. Solidification materials may be transferred to storage receptacles using a transport trailer, a railcar, or another approach. Solidification materials may also be transferred via hoses and a piping system, with a blower being used to provide a motive force for transferring the materials.

At operation 906, solidification materials may be transferred to one or more weigh bins. Where raw solidification materials have been kept separate from each other, each type of raw solidification material may be weighed separately. At operation 908, each ingredient may be weighed to determine the weight of solidification materials within the weigh bin.

At operation 910, each ingredient of the solidification materials may be combined in a mixer. Thus, where raw solidification materials have been kept separate from each other, these raw solidification materials may be combined together at operation 910. At operation 912, ingredients may be mixed to create a homogenous dry-blend of solidification materials.

At operation 914, solidification materials may be transferred from the mixer to a container (e.g., containers 102). The container may be a dual-use container that may be used for both solidification and disposal of material. As described above, the container may have an internal mixing impeller. In some embodiments, the container may have a "lost-paddle" design where the mixing impeller is not removed from the homogenous grout product after mixing. Instead, the mixing impeller in such embodiments remains within the container throughout the process including disposal. This use of such a "lost-paddle" design may be advantageous because it may: (1) minimize work for operators; (2) minimize the potential spread of radioactive contamination associated with handling the mixing impeller; and (3) minimize secondary waste that results from cleaning grout off the mixing impeller. A lid may be secured on the container at operation 916, and, at operation 918, the container may be transported to an on-site location at a nuclear facility. Note that embodiments are contemplated in which the solidification materials are added with the lid in place as noted above.

FIG. 9B is a flow chart illustrating an example method of providing waste into containers for solidification, in accordance with an embodiment of the present invention. In some embodiments, the operations of FIG. 9B may be performed at an on-site location at a nuclear facility.

At operation 920, the container having the solidification materials may be unloaded and, at operation 922, placed inside an enclosure, e.g., with a forklift. The enclosure may have various systems that are capable of controlling radioactivity. These systems may include various vents and drains. In addition or in the alternative, the container may be loaded on a conveyor and indexed to the proper position.

At operation 924, the fill head may be connected to the container. This may enable the transfer of waste materials (e.g., in liquid form) from a waste feed line to the container. In some embodiments, the fill head may be connected to the container by lowering an overhead hoist onto the container. However, in other embodiments, the fill head may shift laterally or in other directions to accomplish a connection with a container. In some embodiments, the fill head may be at least partially rotated to ensure that the fill head is oriented properly for connection with the container, and one or more alignment pins may be provided on the fill head to assist in accomplishing the proper orientation.

At operation 926, a motor associated with the fill head may be energized to activate the internal mixing impeller within the container. As noted above, the motor may be in communication with a suitable power unit such as a hydraulic power unit that provides power to the motor. Activation generates movement of the internal mixing impeller by rotation of a central shaft, by actuating linear movement of a component within the container, or in other ways. Rotation of the internal mixing impeller may increase to a predetermined rotational speed before any waste material is added in some embodiments. This will have a tendency to loosen and further mix the solidification materials before the waste material is added.

At operation 928, the container may be filled with waste material. The liquid flow rate may vary depending on the size of the container but may typically be in the range of 25-35 gallons per minute. The total amount of liquid entering the container is preferably monitored by a flow meter, and the flow meter may provide feedback to the control panel. The flow of waste material may be stopped automatically or by an operator after a specified amount of waste material has been added. After flow of waste material has been stopped, the waste feed line may be flushed with water. This may be done in the direction of the mixing container in some embodiments, and approximately two or three hose-volumes of water may be used to flush the waste feed line.

The amount of waste material that is added may be pre-determined in some embodiments. The internal mixing impeller may be activated, or remain activated, as the container is filled with waste material. Waste material and any solidification materials may be mixed within the container at operation 930 to form a homogenous grout product. Mixing may continue for a prescribed amount of time in accordance with a pre-approved Process Control Program (PCP). In some embodiments, the mixing time may be approximately 15 minutes. However, other mixing times may also be used (e.g., 10 minutes, 20 minutes, 25 minutes, etc.), as necessary or desired. Mixing may continue for a specified time period, and an operator may observe the grout product after that time period has elapsed to see whether it appears homogenous using the fill head camera.

Once mixing is complete, the fill head may be remotely disengaged and lifted from the container. The fill head may be placed on a "fill head stand," and the filled container may be allowed to cure in place or the container may move forward to a curing area. Additionally, the container filled with a homogenous grout product may be covered with an ALARA ("As Low As Reasonably Achievable") lid (e.g., containing a passive vent filter) and conveyed to a curing area.

At operation 932, the grout within the container is cured (e.g., allowed to cure). Curing may be performed until a monolithic product is formed, with the cured product being suitable for movement to a storage area or disposal site. The curing time may vary depending on the waste material characteristics and grout formulation, but this curing process will often take about one to three days to form a monolithic product with no bleed water.

At operation 934, the final product may be inspected and a lid may be secured on the container. An ALARA lid on the container may be removed to permit inspection. Inspection may be done, for example, to verify that bleed water has been absorbed and to ensure that a homogenous monolithic product has been formed.

At operation 936, the lidded container may be transported to a disposal site or to a storage area. The lidded container may be transferred to an interim storage area, which may be indoors or outdoors. The lidded container may alternatively be transferred to a truck-trailer, a railcar, or another vehicle for transportation to a disposal site. Two lidded containers may be provided per truck in some embodiments, and eight or nine lidded containers may be provided per railcar in some embodiments.

The methods illustrated in FIGS. 9A and 9B and described above may be performed repetitively for different containers. It should be understood that the order of certain operations may be changed in some embodiments. Further, it should be understood that certain operations may be omitted or that additional operations may be added.

In some embodiments, the system may operate to process approximately 3140 gallons per day of waste material. This may result in the production of approximately four filled containers per day. This throughput may be accomplished in approximately eight hours, with a container cycle time of two hours. Additional treatment and packaging areas may be provided with sufficient size to accommodate the production of eight or more containers per day.

Figure 10A:
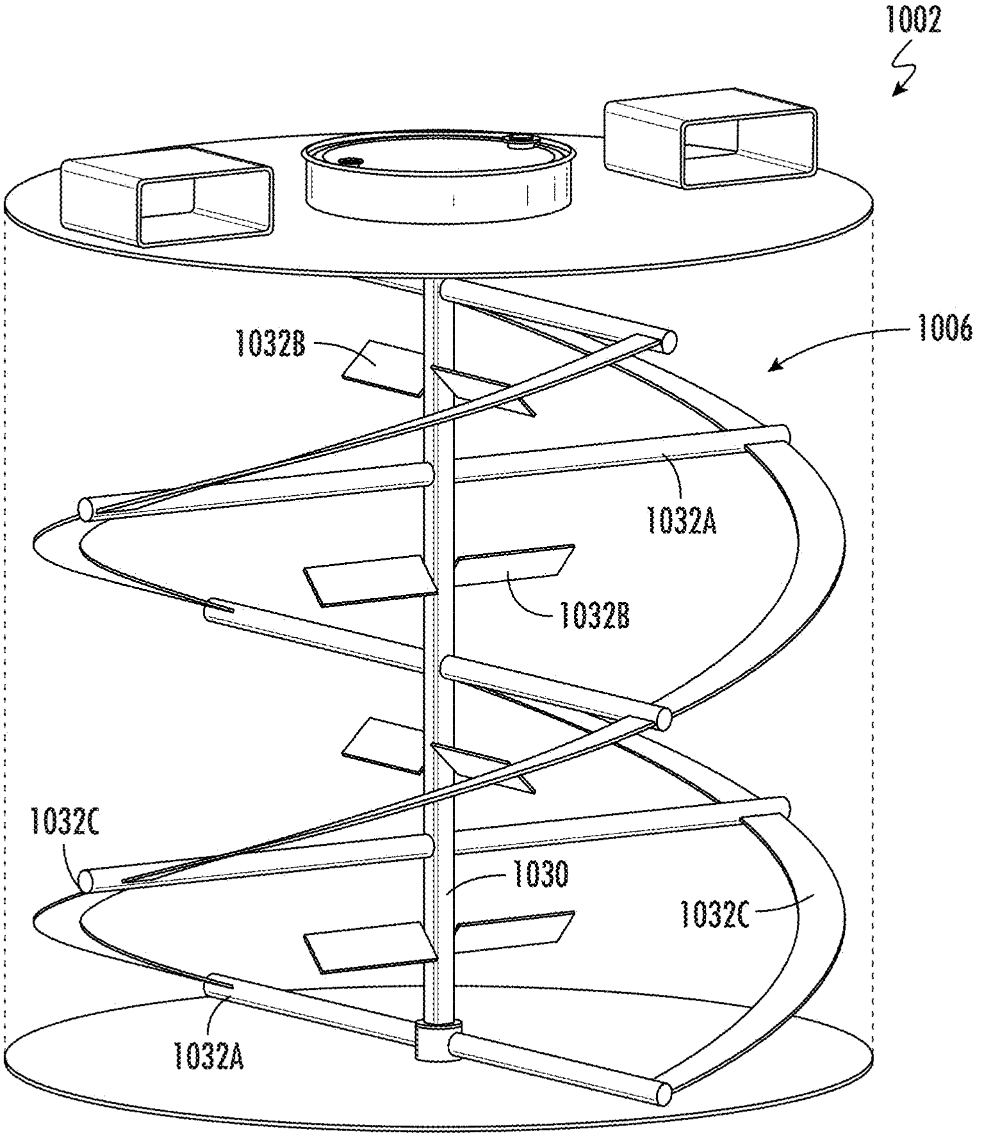
FIG. 10A is a perspective view of another embodiment of a container with the side being shown in phantom to reveal internal structure, in accordance with an embodiment of the present invention.
Figure 10B:
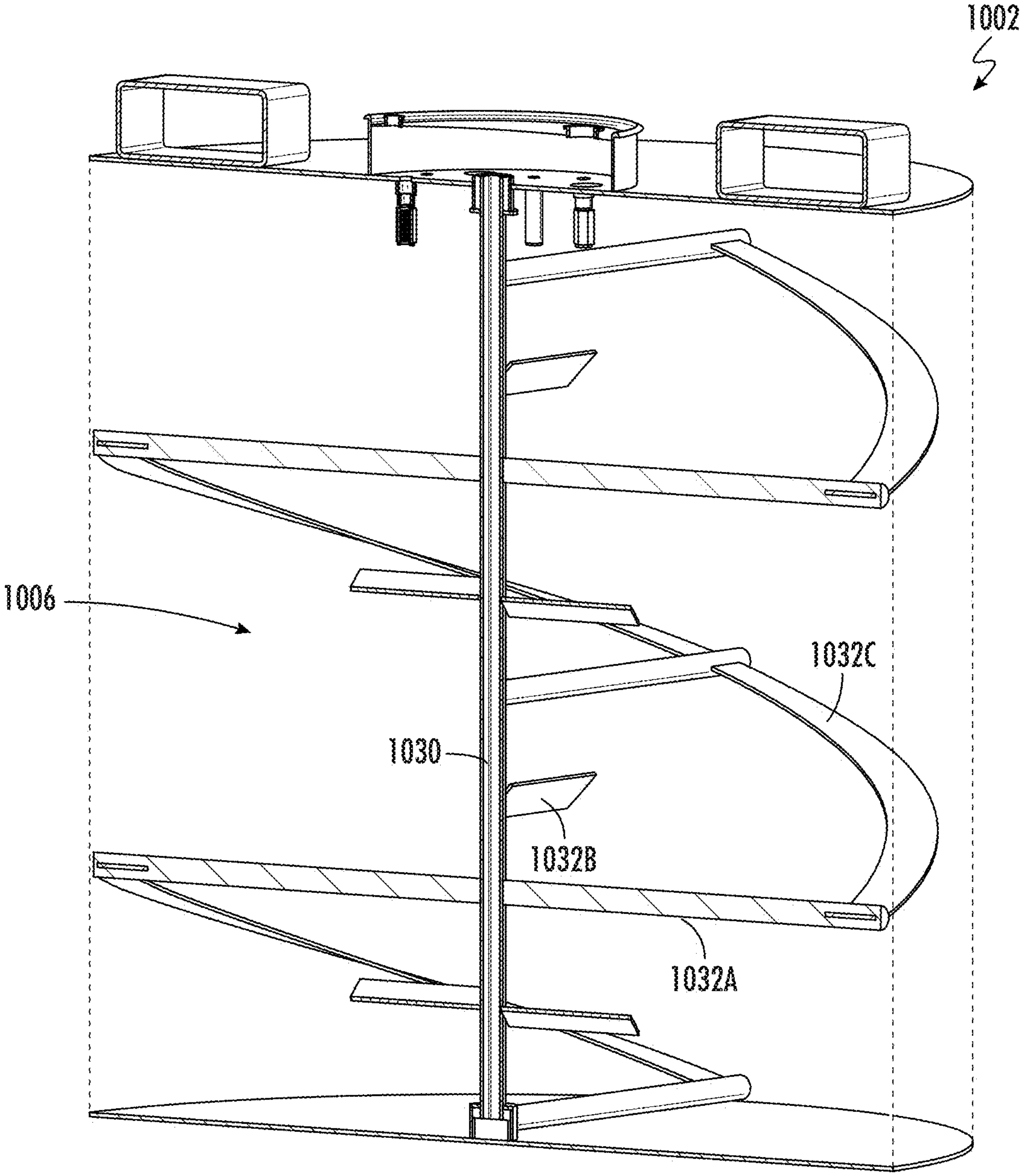
FIG. 10B is a cross-sectional view of the container of FIG. 10A.

FIGS. 10A and 10B illustrate a container 1002 in accordance with an alternative embodiment of the present invention. The container 1002 is similar in many respects to the container 102 described above, but utilizes a modified impeller 1006. In this case, the impeller 1006 comprises a plurality of cross members 1032A (analogous to primary blades 132A) spaced apart along the axial length of shaft 1030. The cross members 1032A are attached in sets of two in a straight line transverse to the shaft 1030 (which may be formed by one long cross member passing through an aperture in shaft 1020). Between different levels of the members 1032A are pairs of shorter secondary blades 1032B. Blades 1032B are attached to shaft 1030 in sets of two, oriented at angle relatively to the axis as shown.

As shown, cross members 1032A at different levels are angularly offset from each other in order to support at least one interconnect structure 1032C. In this case, two interconnect structures 1032C are provided, each in the form of a ribbon-shaped helical element. The two helical elements are attached to distal ends of the members 1032A so as to be arranged in a double helix.

In accordance with preferred methodology, dry cementitious solidification materials are first added to container 1002. Then, the mixing impeller 1006 starts rotating in the dry powder. Liquid radioactive waste material is then added to the dry materials while mixing impeller 1006 continues to rotate.

The impeller 1006 rotates in a direction to create movement up along the container wall, thus lifting a majority of the dry materials. As the cementitious material is wetted with inflowing radioactive liquids, it creates a viscous fluid (grout), that moves up the container wall and returns down the center of the impeller in an axial manner. The axial movement allows this impeller type to create a uniformly mixed grout in less time and at lower torque than traditional mixing impellers, thus improving overall mixing efficiency.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for the solidification and packaging of waste comprising:
- providing a container;
- introducing solidification materials into the container at a first site location;
- transporting the container having the solidification materials to a second site location;
- introducing waste materials into the container at the second site location, wherein introducing waste materials into the container at the second site location comprises introducing the waste materials into an interior of the container at multiple positions; and
- mixing the waste materials and the solidification materials in the container at the second site location to yield a grout material,
- wherein the first location is not located on-site at a nuclear facility and wherein the second location is located on-site at a nuclear facility,
- wherein the step of providing the container comprises providing the container having at least one internal channel configured to distribute the waste materials to the multiple positions within the container.

2. The method of claim 1, wherein the step of providing the container comprises including an internal mixing impeller in the container and wherein mixing the waste materials and the solidification materials in the container at the second site location is accomplished using the internal mixing impeller.

3. The method of claim 2, further comprising allowing the grout material to solidify in the container with the internal mixing impeller in situ.

4. The method of claim 2, further comprising:
- allowing the grout material to solidify in the container; and
- disposing of the container with the grout material therein.

5. The method of claim 2, wherein the internal mixing impeller is configured to operate with sufficient torque to mix the solidification materials in the container when no waste materials are present.

6. The method of claim 5, wherein:
- the internal mixing impeller comprises a shaft connected to a motor; and
- the motor is configured to impart at least approximately 2,000 lb-ft of torque on the shaft.

7. The method of claim 2, further comprising steps of:
- allowing the grout material to solidify in the container; and
- disposing of the container with the internal mixing impeller in situ.

8. The method of claim 1, further comprising placing the container inside a transportable modular enclosure.

9. The method of claim 1, wherein the step of inserting the waste materials into the container involves transferring the waste materials from a waste tank at the second site location.

* * * * *